(12) United States Patent
Leverman

(10) Patent No.: US 11,530,041 B2
(45) Date of Patent: Dec. 20, 2022

(54) MULTI-BAY DRONE FOR REMOVING AND REPLACING A DEVICE IN A DEVICE RECEPTACLE IN A SINGLE VISIT

(71) Applicant: Inventus Holdings, LLC, Juno Beach, FL (US)

(72) Inventor: Jeroen Leverman, Fort Pierce, FL (US)

(73) Assignee: INVENTUS HOLDINGS, LLC, Juno Beach, FL (US)

(*) Notice: Subject to any disclaimer, the term of this patent is extended or adjusted under 35 U.S.C. 154(b) by 295 days.

(21) Appl. No.: 16/891,542

(22) Filed: Jun. 3, 2020

(65) Prior Publication Data

US 2021/0380244 A1 Dec. 9, 2021

(51) Int. Cl.
| | |
|---|---|
| *B64D 9/00* | (2006.01) |
| *B64C 39/02* | (2006.01) |
| *B64D 41/00* | (2006.01) |
| *B64D 47/08* | (2006.01) |
| *B64D 1/22* | (2006.01) |

(52) U.S. Cl.
CPC .............. *B64D 9/00* (2013.01); *B64C 39/024* (2013.01); *B64D 1/22* (2013.01); *B64D 41/00* (2013.01); *B64D 47/08* (2013.01); *B64C 2201/027* (2013.01); *B64C 2201/108* (2013.01); *B64C 2201/12* (2013.01); *B64C 2201/127* (2013.01)

(58) Field of Classification Search
CPC . B64D 9/00; B64D 1/22; B64D 47/08; B64D 41/00; B64C 39/024; B64C 2201/027; B64C 2201/108; B64C 2201/12; B64C 2201/127; B64C 2201/128

See application file for complete search history.

(56) References Cited

U.S. PATENT DOCUMENTS

| | | | |
|---|---|---|---|
| 9,688,404 B1* | 6/2017 | Buchmueller | ............ B64D 1/12 |
| 9,969,494 B1* | 5/2018 | Buchmueller | ............ B64D 1/12 |
| 10,071,804 B1* | 9/2018 | Buchmueller | ............ B64D 1/12 |
| 10,384,804 B2 | 8/2019 | Priest | |
| 10,717,524 B1* | 7/2020 | Boyes | ..................... B64C 27/08 |
| 2015/0120094 A1* | 4/2015 | Kimchi | ............. G06Q 30/0641 |
| | | | 701/3 |
| 2016/0323751 A1 | 11/2016 | Priest et al. | |
| 2017/0081028 A1* | 3/2017 | Jones | .................... B64C 39/024 |
| 2017/0323256 A1* | 11/2017 | Cheatham, III | ...... B64C 39/024 |
| 2018/0086453 A1 | 3/2018 | Scott-Nash et al. | |
| 2018/0229843 A1 | 8/2018 | Costanzo et al. | |
| 2019/0263521 A1 | 8/2019 | O' et al. | |
| 2020/0031460 A1* | 1/2020 | Millhouse | ............. B64C 39/024 |

(Continued)

*Primary Examiner* — Benjamin P Lee
(74) *Attorney, Agent, or Firm* — Tarolli, Sundheim, Covell & Tummino LLP

(57) ABSTRACT

A drone for replacing a removeable device can include a drone body with at least three lift-generating rotors spaced apart from the drone body and operating in concert that provide lift sufficient to propel the drone in at least six directions. The drone can include a first bay attached to the drone body, the first bay comprising a first mounting mechanism to dismount a first removeable device from a device receptacle and to securely stow the first removeable device. The drone can also include a second bay attached to the drone body comprising a second mounting mechanism to stow a second removeable device and to mount the second removeable device on the device receptacle.

19 Claims, 19 Drawing Sheets

(56) References Cited

U.S. PATENT DOCUMENTS

| | | | |
|---|---|---|---|
| 2020/0175471 A1* | 6/2020 | Tsuruta | G06Q 10/0838 |
| 2020/0354057 A1* | 11/2020 | Polus | B64D 1/22 |
| 2020/0407197 A1* | 12/2020 | Hafenrichter | B64D 1/22 |
| 2021/0061461 A1* | 3/2021 | Williams | B64C 25/52 |
| 2021/0132625 A1* | 5/2021 | Gillett | G05D 1/0088 |
| 2021/0214082 A1* | 7/2021 | Inuma | B64D 1/12 |
| 2021/0394930 A1* | 12/2021 | O'Toole | B60L 53/80 |
| 2022/0048621 A1* | 2/2022 | Tazume | B64D 47/08 |
| 2022/0055770 A1* | 2/2022 | O'Toole | B64F 1/364 |

* cited by examiner

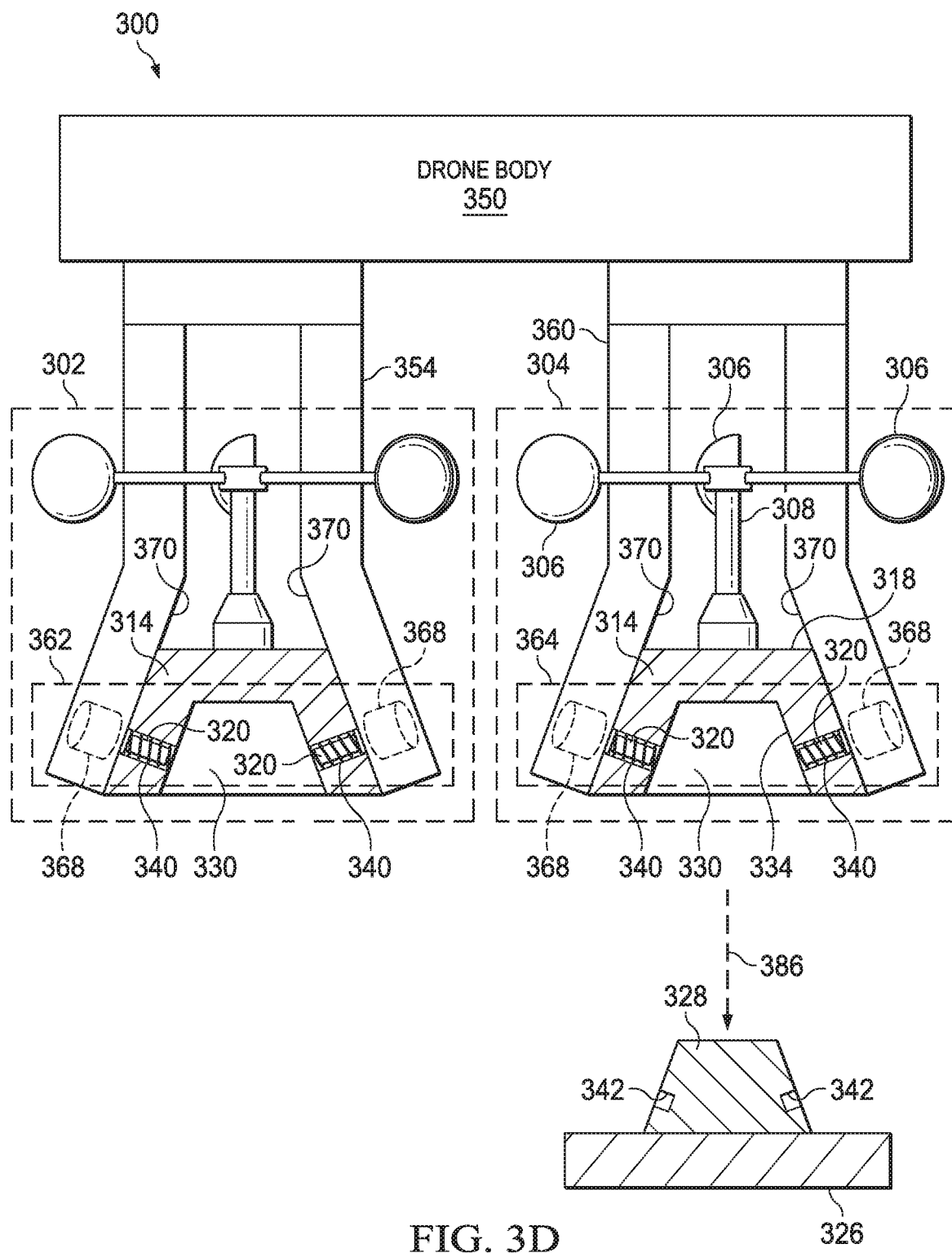

MULTI-BAY DRONE FOR REMOVING AND REPLACING A DEVICE IN A DEVICE RECEPTACLE IN A SINGLE VISIT

TECHNICAL FIELD

This disclosure relates to unmanned aircraft vehicles (drones). More particularly, this disclosure relates to a drone with two bays to replace a removeable device.

BACKGROUND

An unmanned aerial vehicle (UAV) (or uncrewed aerial vehicle) is commonly referred to as a drone. A drone is an aircraft without a human pilot on board and a type of unmanned vehicle. Drones are a component of an unmanned aircraft system (UAS); which include a drone, a ground-based controller, and a system of communications between the two. The flight of drones may operate with various degrees of autonomy: either under remote control by a human operator or autonomously by onboard computers.

Compared to crewed aircraft, drones were originally used for missions too "dull, dirty or dangerous" for humans. While drones originated mostly in military applications, the use of drones use is rapidly expanding to commercial, scientific, recreational, agricultural and other applications, such as policing and surveillance, product deliveries, aerial photography, infrastructure inspections, smuggling and drone racing.

A multirotor or multicopter is a rotorcraft with more than two lift-generating rotors. An advantage of multirotor aircraft is the simpler rotor mechanics employed for flight control. Unlike single- and double-rotor helicopters which use complex variable pitch rotors whose pitch varies as the blade rotates for flight stability and control, multirotors often use fixed-pitch blades; control of vehicle motion is achieved by varying the relative speed of each rotor to change the thrust and torque produced by each.

A delivery drone is an autonomous or semi-autonomous vehicle, often employed to transport packages, food or other goods. Many drones, including delivery drones are implemented by quadcopters. A quadcopter, also referred to as a quadrotor helicopter or quadrotor, is a multirotor helicopter that is lifted and propelled by four rotors. Quadcopters are classified as rotorcraft, as opposed to fixed-wing aircraft, because their lift is generated by a set of rotors (vertically oriented propellers).

SUMMARY

One example relates to a drone for replacing a removeable device. The drone can include a drone body with at least three lift-generating rotors operating in concert that provide lift sufficient to propel the drone in at least six directions. The drone can also include a first bay attached to the drone body, the first bay can have a first mounting mechanism to dismount a first removeable device from a device receptacle and to securely stow the first removeable device. The drone can further include a second bay attached to the drone body that can have a second mounting mechanism to stow a second removeable device and to mount the second removeable device on the device receptacle.

Another example relates to a drone for replacing a removeable device. The drone a first bay attached to an underside of a drone body, the first bay can include a first mounting mechanism to dismount or mount a first removeable device from a device receptacle and to securely stow the first removeable device. The drone can also include a second bay attached to the underside of the drone body, the second bay can have a second mounting mechanism to dismount or mount a second removeable device from the device receptacle and to securely stow the first removeable device. The drone can further include at least three lift-generating rotors mounted on arms extending from the drone body and operating in concert that provide lift sufficient to propel the drone in at least six directions in a condition where the first removeable device and the second removeable device are stowed. The drone can have a wireless transceiver configured to communicate with a ground station and a controller that controls a state of the first mounting mechanism, a state of the second mounting mechanism and a speed of rotation of the at least three lift-generating rotors in response to commands received at the wireless transceiver.

Yet another example relates to a method for replacing a removeable device with a drone. The method can include aligning a drone such that a first bay of the drone overlays a first removeable device mounted in a first device receptacle and a second bay of the drone stows a second removeable device. The method can also include dismounting, with a first mounting mechanism of the first bay, the first removeable device from the first device receptacle. The method can further include stowing, with the first mounting mechanism of the first bay, the first removeable device in the first bay of the drone. The method can still further include mounting, with a second mounting mechanism of the second bay, the second removeable device in the first device receptacle or a second device receptacle, wherein the first removeable device is stowed in the first bay of the drone.

BRIEF DESCRIPTION OF THE DRAWINGS

FIG. 3D illustrates a fourth stage of the third example method for replacing the removable device on the wind turbine.

DETAILED DESCRIPTION

This disclosure is directed to systems and methods for deploying a drone (an unmanned aircraft vehicle) to replace a removeable device. The drone can include a drone body that houses certain components of the drone. A first bay can be attached to an underside of the drone body. The first bay can include a first mounting mechanism to mount or dismount a first removeable device from a device receptacle and to securely stow the first removeable device. A second bay can also be attached to the underside of the drone body. The second bay can include a second mounting mechanism to mount or dismount a second removeable device from the device receptacle and to securely stow the second removeable device.

The drone can be implemented as a multicopter. Accordingly, the drone can include at least three lift-generating rotors operating in concert that provide lift. The lift provided by the at least three lift-generating rotors is sufficient to propel the drone in at least six directions in a condition where the first removeable device and the second removeable device are stowed in the first bay and the second bay, respectively.

To replace the first removeable device with the second removeable device, the drone can be aligned such that the first bay of the drone overlays the first removeable device mounted in a device receptacle. The drone can dismount, with the first mounting mechanism of the first bay, the first removeable device from the device receptacle. The drone can be re-aligned such that the second bay overlays the device receptacle, and the second bay stows the second removeable device. The second mounting mechanism of the second bay can mount the second removeable device in the device receptacle. The drone can replace the first removeable device mounted in the device receptacle with the second removeable device with a single visit to the device receptacle. Accordingly, the drone can be employed to reduce downtime of a system (e.g., a wind turbine) employing the removeable device and obviate a need for a human to physically visit the device receptacle.

Figure 1:
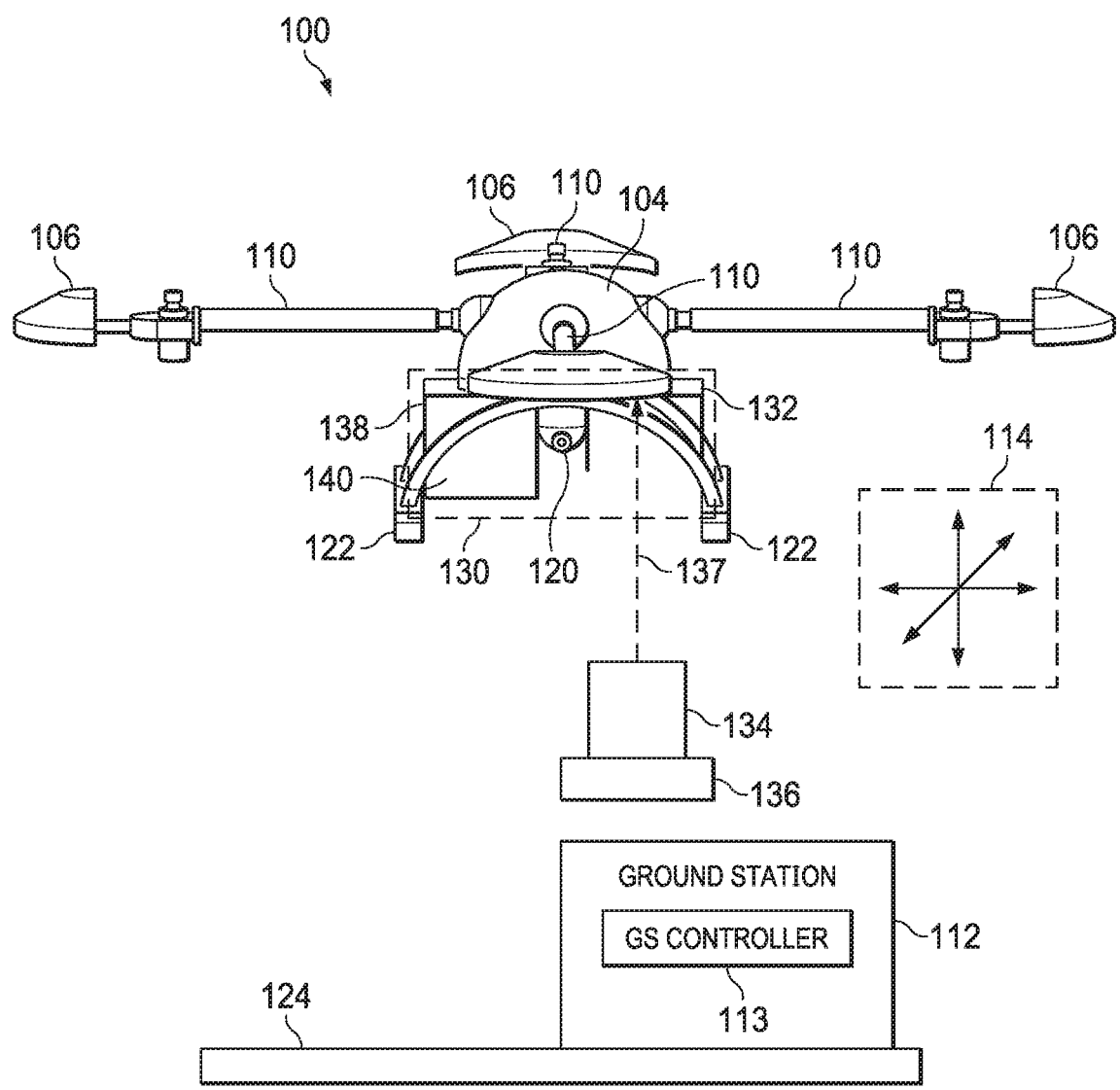
FIG. 1 illustrates an example of a drone for replacing a removeable device.

FIG. 1 illustrates an example of a drone 100 that is deployable to replace a removeable device from a device receptacle in a single visit to the device receptacle. The drone 100 is an unmanned aircraft vehicle (UAV). The drone 100 can include a drone body 104 that can be formed for example, with a pliant material such as plastic or metal. The drone 100 can be implemented as a multicopter, namely, a rotorcraft with three or lift-generating rotors 106. In the example illustrated, the drone 100 includes four lift-generating rotors 106 (e.g. a rotor and a propeller), however, in other examples, the drone 100 could have three lift-generating rotors 106 or more than four lift generating rotors (e.g., six, eight, etc.).

The drone body 104 can include a plurality of arms 110 that extend from the drone body 104 to a corresponding lift-generating rotor 106. Accordingly, the plurality of lift-generating rotors 106 can be spaced apart from the drone body 104. Thus, in the example illustrated there are four arms 110. The drone body 104 can house a wireless transceiver to wirelessly communicate with a ground station 112 or another entity. The transceiver can wirelessly receive commands from the ground station 112 or other entity. Moreover, the drone body 104 can house a controller that can interpret commands provided through the transceiver and control operations of the drone 100. In particular, the controller can selectively and individually control a rotational speed of the lift-generating rotors 106. Changing a rotational speed of one or more lift-generating rotors 106 relative to another lift-generating rotor 106 causes the drone 100 to move in a specific direction. Moreover, the drone 100 is configured to allow movement in at least six directions, as indicated by a cartesian coordinate system 114. Additionally, the drone 100 can be configured to allow the drone to tilt and/or rotate in any direction indicated in the cartesian coordinate system 114. The ground station 112 and the drone 100 can be constituent components of a system, such as an unmanned aircraft system.

The drone 100 can include a camera 120 that can capture images in real-time and provide the captured images to the controller. In response, the controller can encode the images and provide the encoded images to the wireless transceiver and transmit the encoded images to the ground station 112. The ground station 112 can include a ground station controller 113 that can provide an interface for an operator (e.g., a user) to allow the operator to send commands to the drone 100. In some examples, the ground station controller 113 can include a display for outputting information to the operator. In this manner an operator (e.g., a user or a computing platform) can observe in real-time (e.g., within one second) vantage point (e.g., a point of view) of the drone 100. The drone 100 can also include a pair of runner blades 122 that allow the drone to rest in situations where the lift-generating rotors 106 are turned off. For example, the drone 100 may rest on a landing pad 124 that may be proximal to the ground station 112.

As noted, the drone 100 is deployable to replace a removeable device from a device receptacle in a single visit to the device receptacle. Thus, the drone 100 can include a cargo region 130 to stow the removeable device. The cargo region 130 can be attached to a bottom of the drone body 104. That is, the cargo region 130 can underly the drone body 104. The cargo region 130 can include a plurality of bays, such that the drone 100 can be referred to as a multi-bay drone. More particularly, the cargo region 130 can include a first bay 132 that can include a first mounting mechanism to dismount a first removeable device 134 from a particular device receptacle 136 and to securely stow the first removeable device 134 within the first bay 132, as indicated by the arrow 137. The cargo region 130 can also include a second bay 138. The second bay 138 can include a second mounting mechanism to stow a second removeable device 140 and to mount the second removeable device on the device receptacle 136.

In some examples, the first bay 132 and the second bay 138 can be different instances of the same bay, such that operations of the first bay 132 and the second bay 138 are interchangeable. Thus, the first mounting mechanism of the first bay 132 and the second mounting mechanism of the second bay 138 can also be different instances of the same mounting mechanism. In this manner, the second removeable device 140 could initially be stowed in the first bay 132 rather than the second bay 138.

The device receptacle 136 can be a mount for a system (e.g., a power generation system, such as a wind turbine) that mechanically secures (e.g., fastens) and electrically couples an instance of the removeable device to the system. The device receptacle 136 can include locking pins, screw threads, etc. The instance of the removeable device (e.g., the first removeable device 134 or the second removeable device 140) can be a sensor or an output device for the system. As some examples, the removeable device can be an anemometer (e.g., a wind speed sensor), a temperature sensor, an accelerometer, a light emitting device (e.g., a light beacon) or a combination thereof. The examples provided herein are not meant to be exhaustive. In other examples, other types of devices can be employed for the first removeable device 134 and the second removeable device 140. Additionally, in some examples, the first removeable device 134 and the second removeable device 140 can be different instances of the same device. In other examples, the first removeable device 134 and the second removeable device 140 can be different models of the same device. For instance, the second removeable device 140 may be an updated version or the first removeable device 134.

In some examples, the first mounting mechanism of the first bay 132 and the second mounting mechanism of the second bay 138 can include electromagnets that can be energized to attract locking pins of the respective first removeable device 134 and the second removeable device 140. Additionally or alternatively, the first mounting mechanism of the first bay 132 and the second mounting mechanism of the second bay 138 can include clamp arms to grip the respective first removeable device 134 and the second removeable device 140. In such a situation, the first mounting mechanism of the first bay 132 and the second mounting mechanism of the second bay 138 may include respective first and second motors for the respective first removeable device 134 and the second removeable device 140. In some examples, the spinning can screw or unscrew the respective first removeable device 134 and the second removeable device 140 from/to the device receptacle 136 to facilitate the mounting and dismounting of the first removeable device 134 and the second removeable device 140.

Additionally, the lift-generating rotors 106 can generate sufficient lift to stow both the second removeable device 140 and the first removeable device 134 (once removed from the device receptacle 136) concurrently. Accordingly, the drone 100 can mount the second removeable device 140 in the device receptacle 136 in a single trip to the device receptacle 136 (e.g., without returning to the landing pad 124 or any other ground position). In situations where the device receptacle 136 is difficult to reach, the drone 100 can replace the first removeable device 134 with the second removeable device 140 without putting a human operator in danger.

Figure 2A:
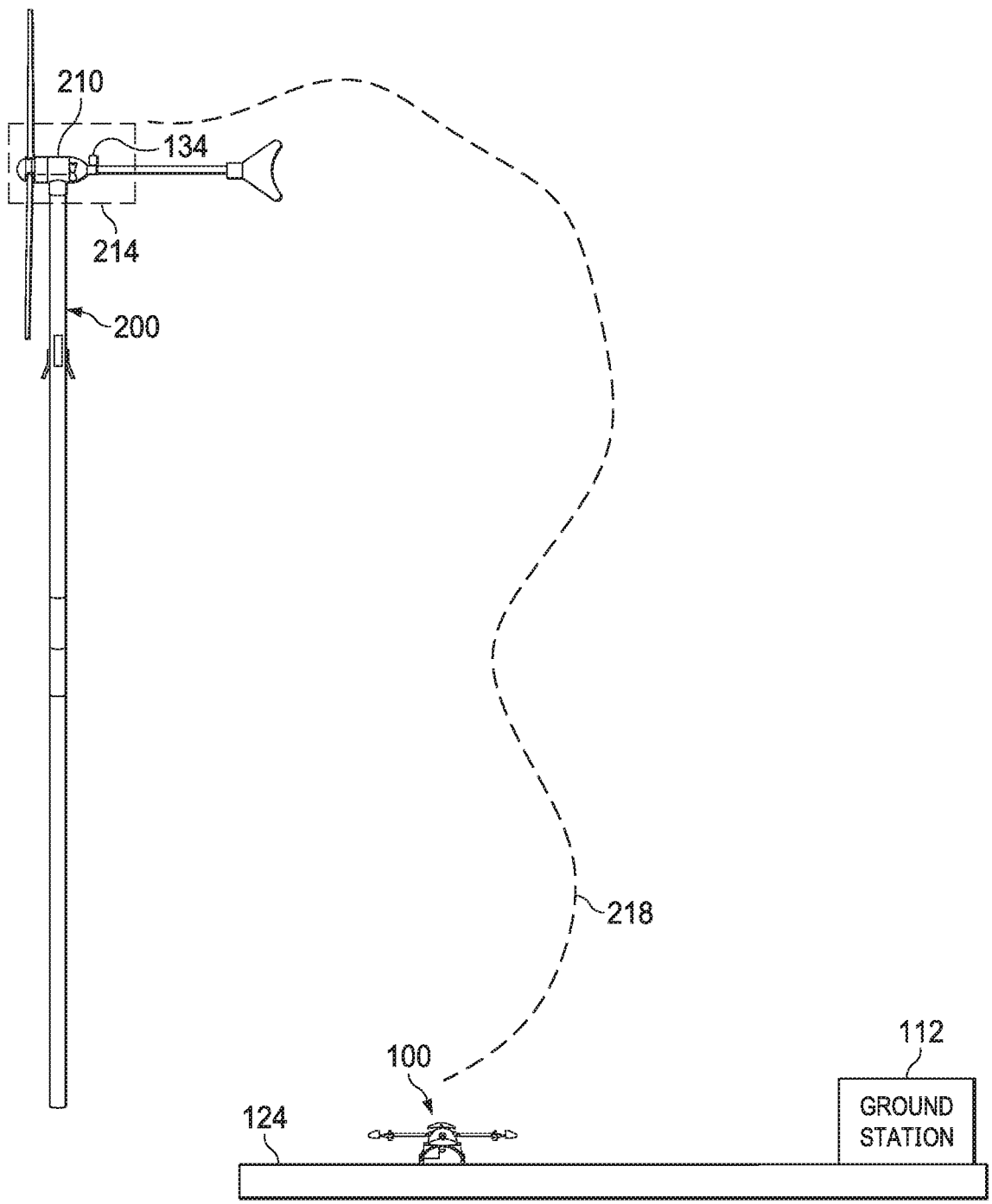
FIG. 2A illustrates a first stage of a first example and a second example method for replacing a removable device on a wind turbine.
Figure 2B:
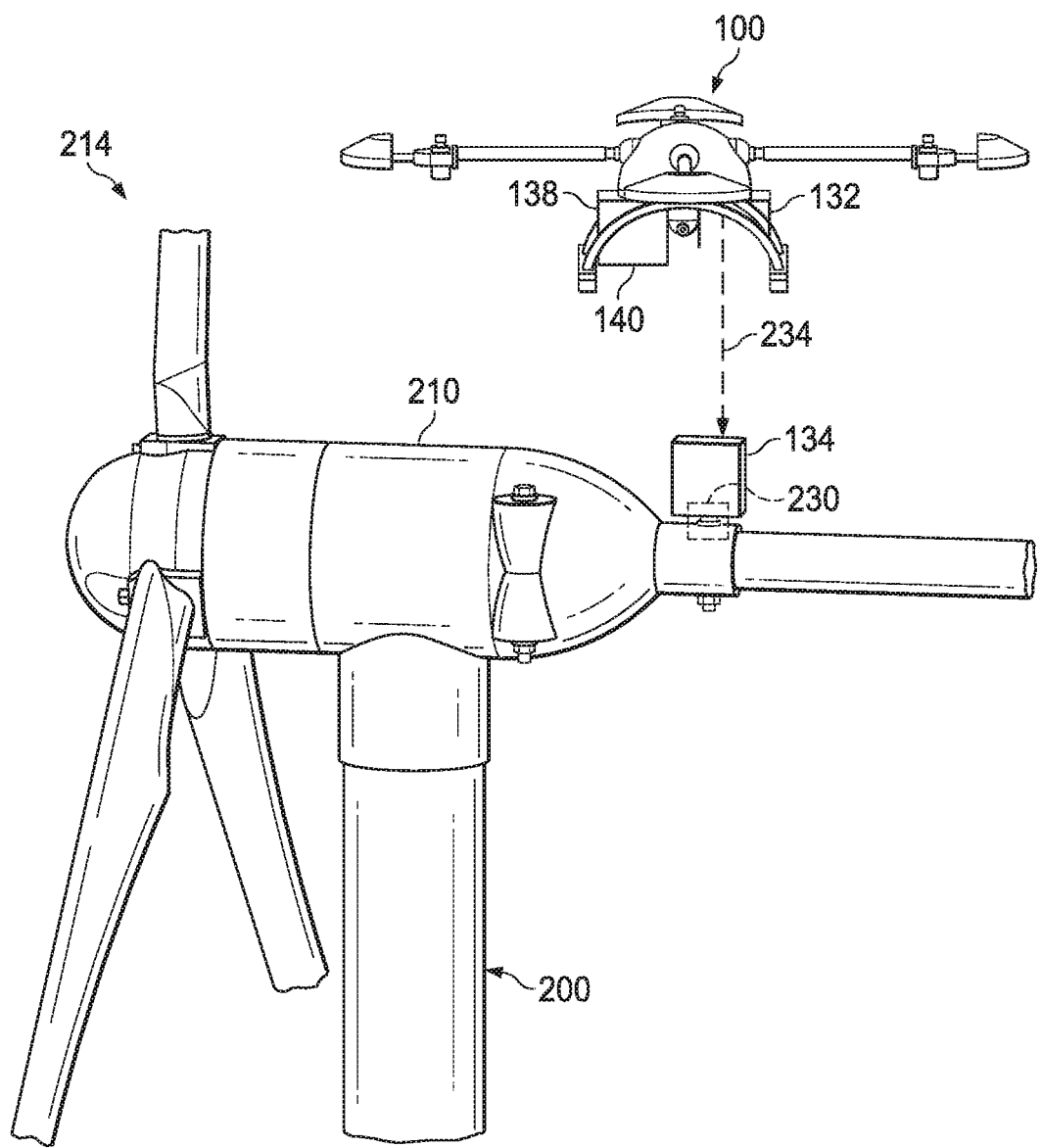
FIG. 2B illustrates a second stage of the first example method for replacing the removable device on the wind turbine.
Figure 2C:
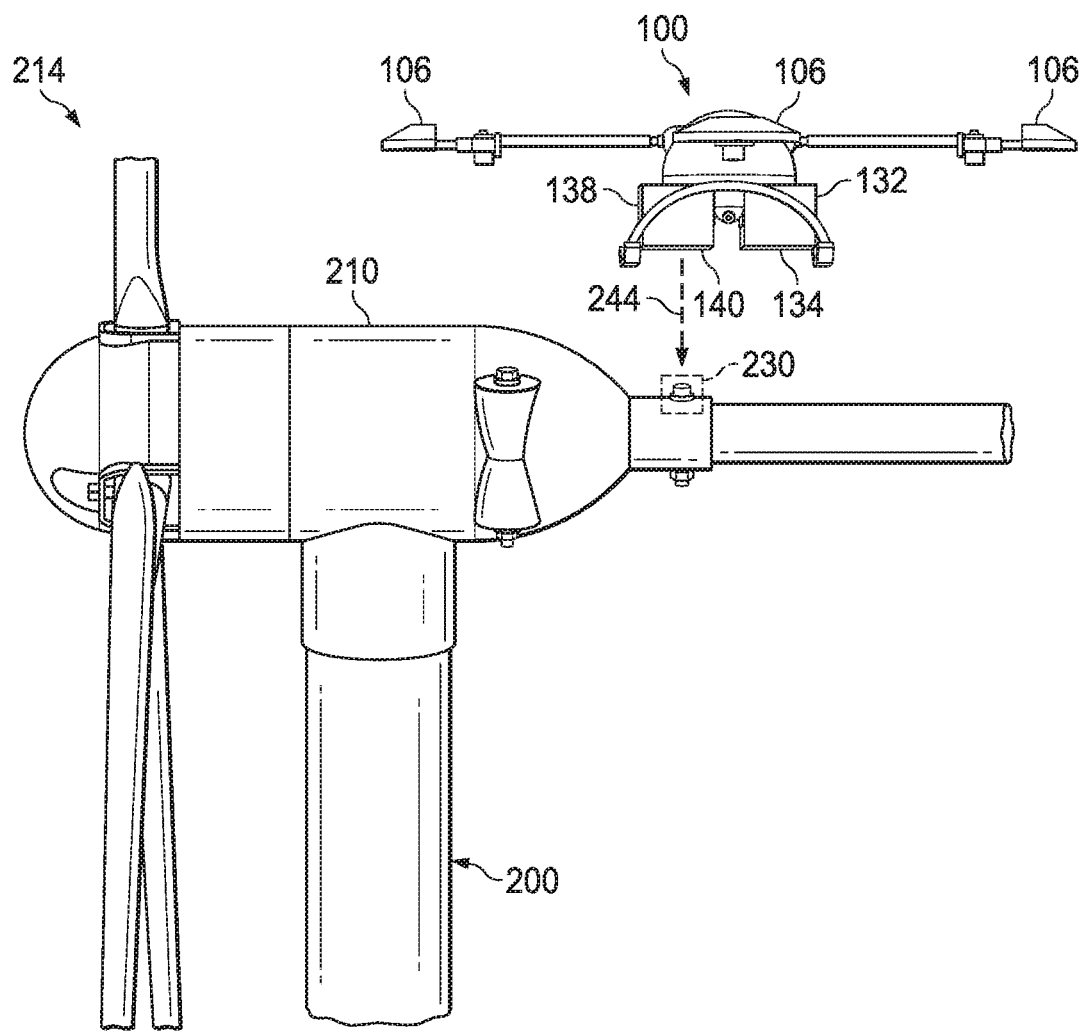
FIG. 2C illustrates a third stage of the first example method for replacing the removable device on the wind turbine.
Figure 2D:
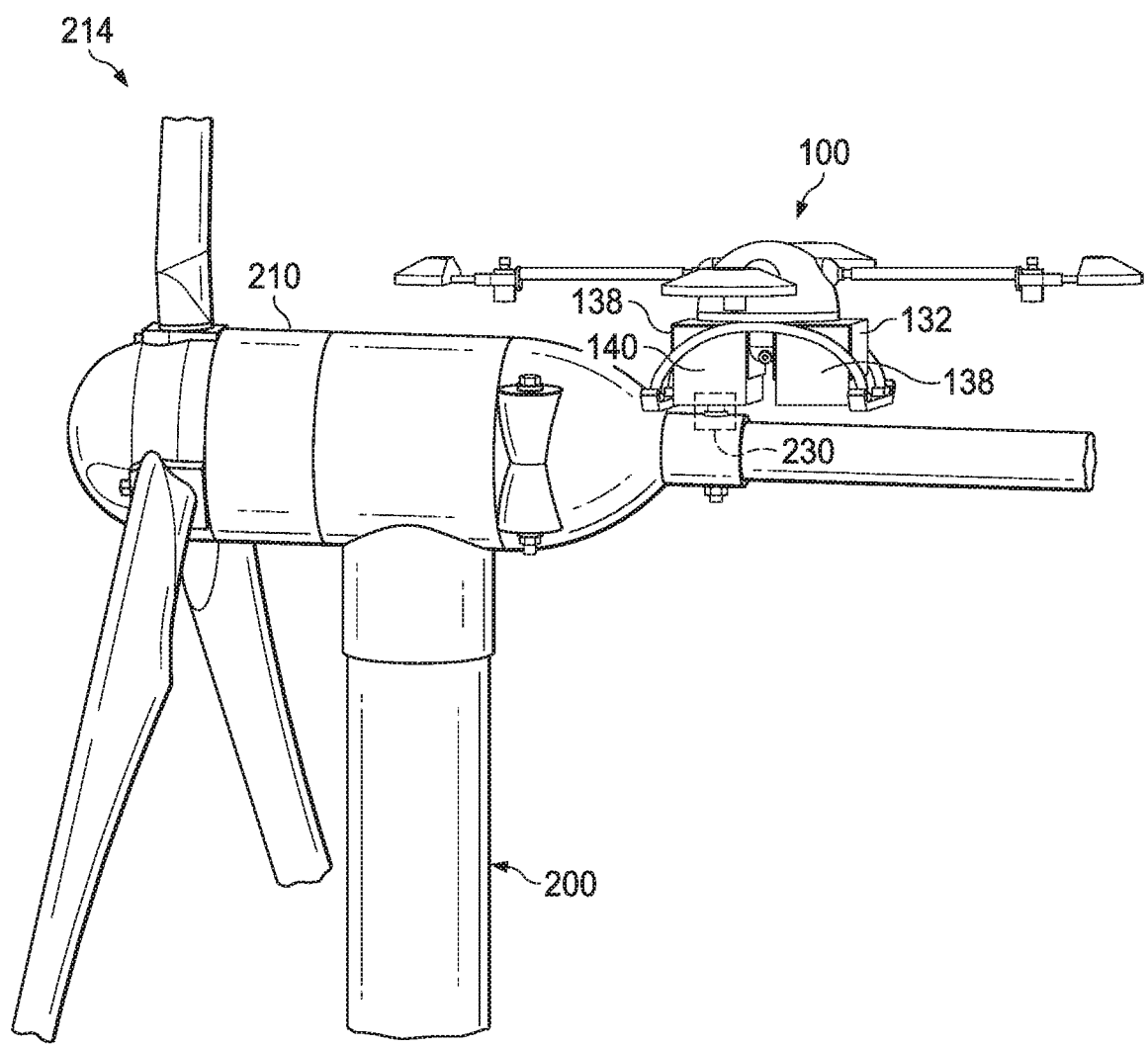
FIG. 2D illustrates a fourth stage of the first example method for replacing the removable device on the wind turbine.
Figure 2E:
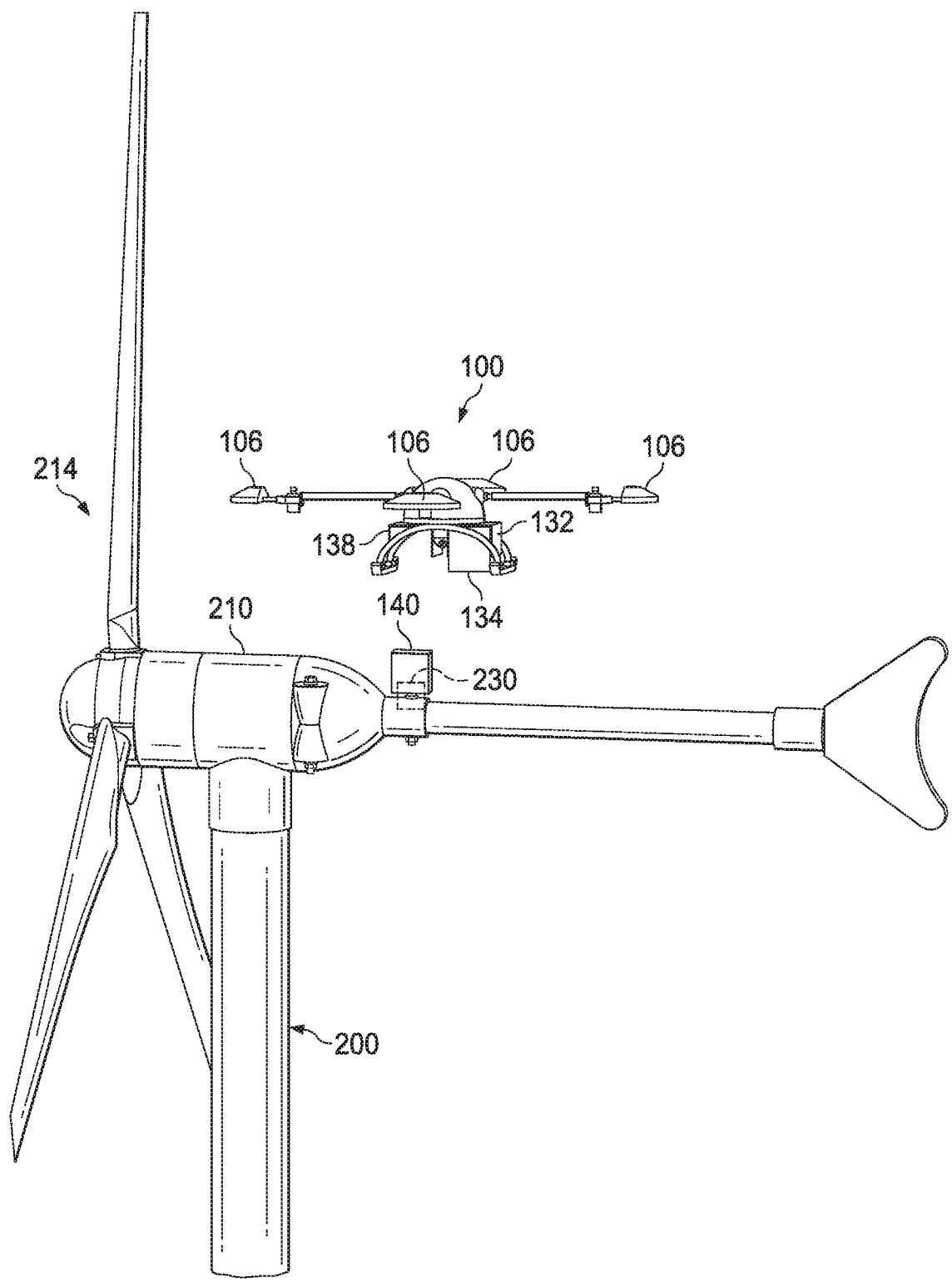
FIG. 2E illustrates a fifth stage of the first example method for replacing the removable device on the wind turbine.
Figure 2F:
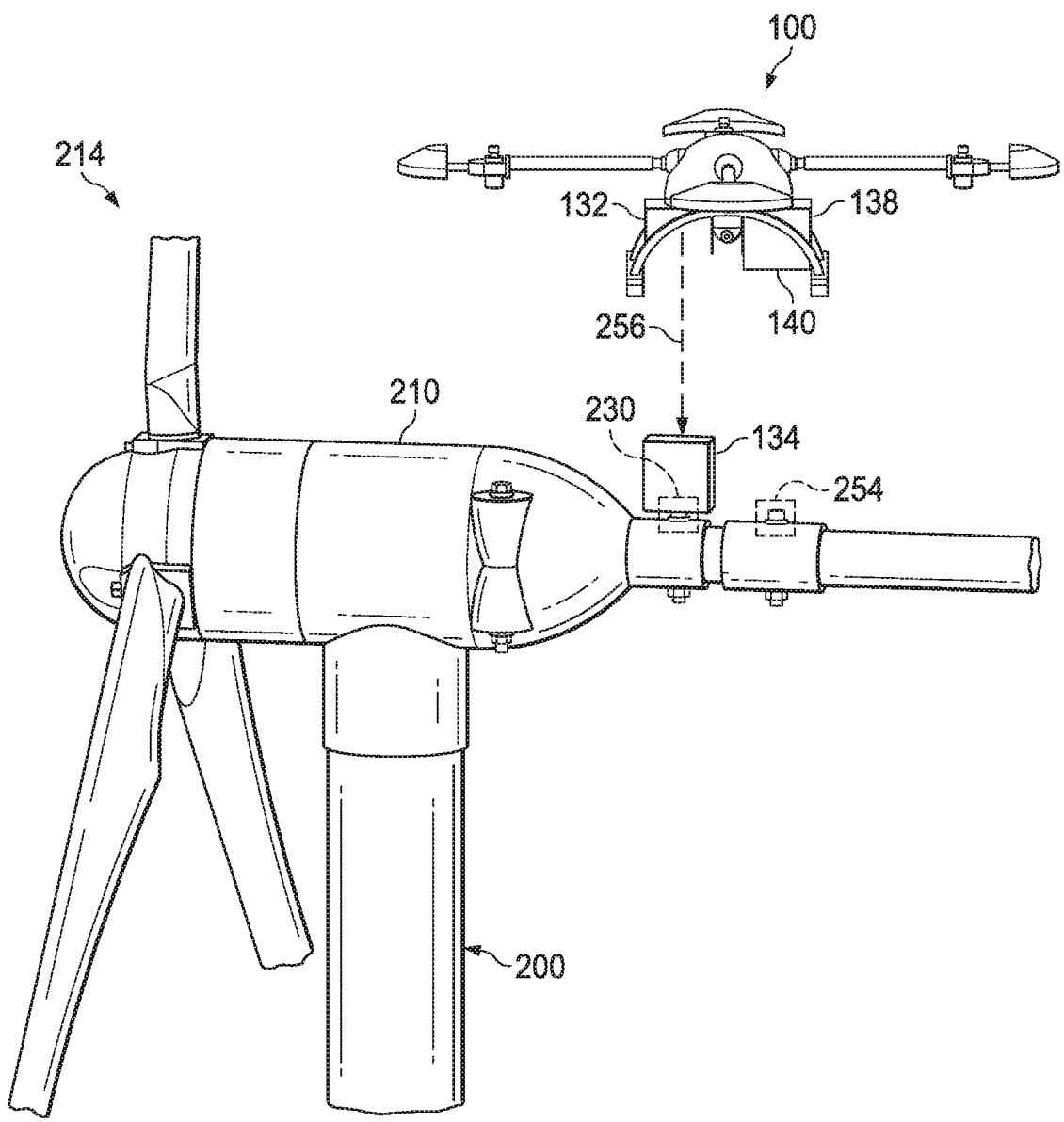
FIG. 2F illustrates a second stage of the second method for replacing the removable device on the wind turbine.
Figure 2G:
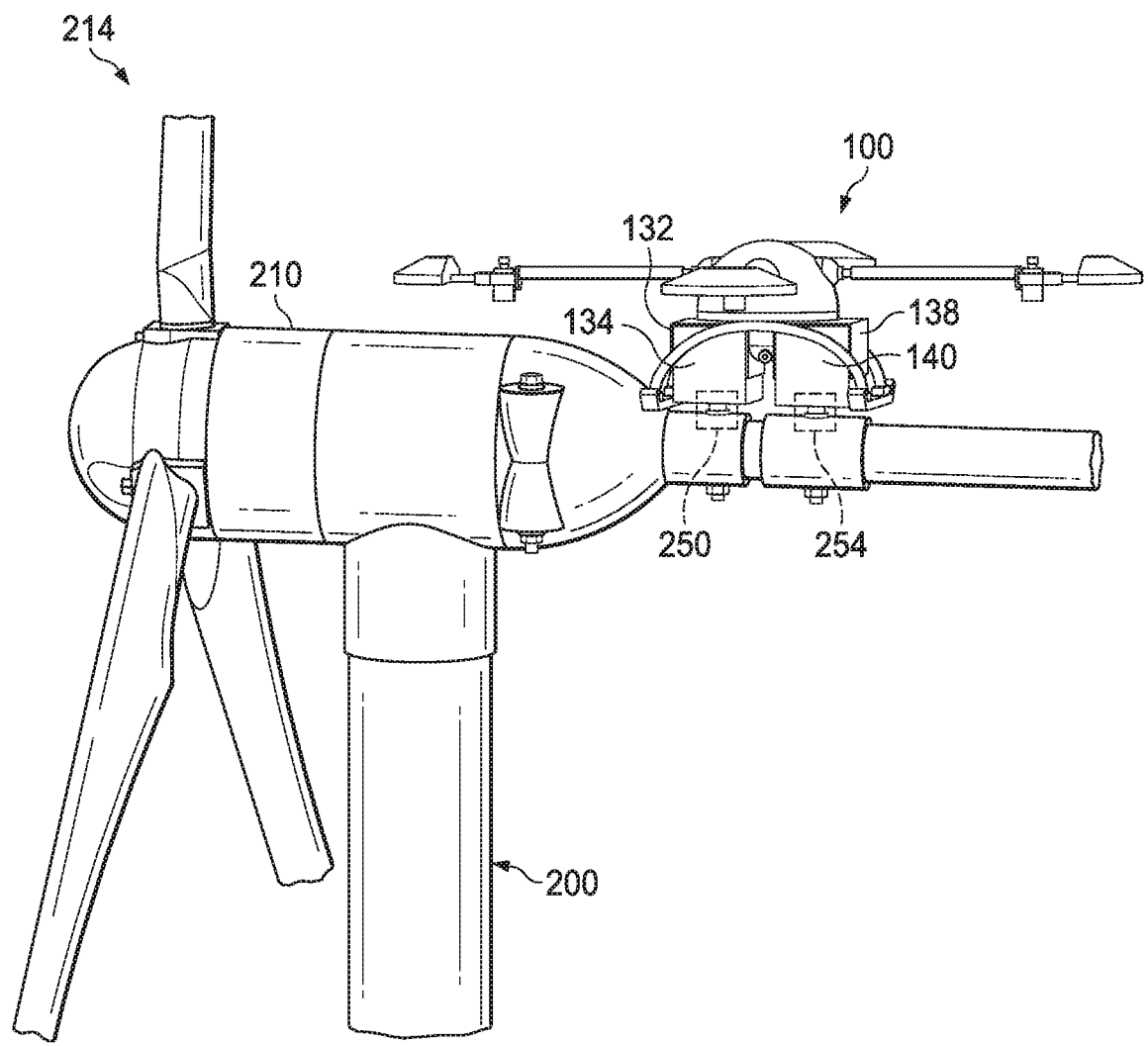
FIG. 2G illustrates a third stage of the second method for replacing the removable device on the wind turbine.
Figure 2H:
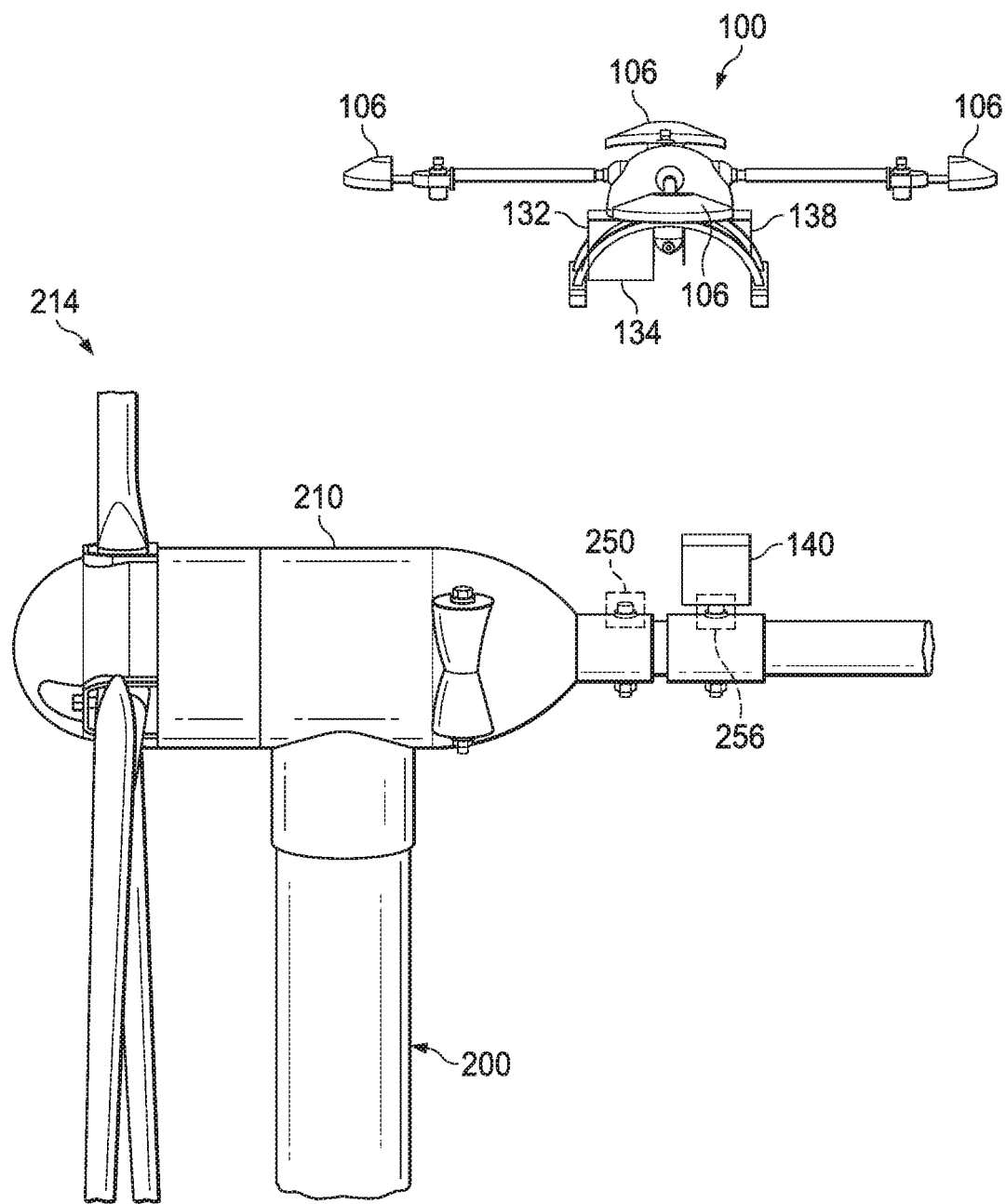
FIG. 2H illustrates a fourth stage of the second method for replacing the removable device on the wind turbine.

FIGS. 2A-2H depict a stages of a first example method ("first example") and a second example method ("second example") where the drone 100 of FIG. 1 is deployed from the landing pad 124 to replace the first removeable device 134 with the second removeable device 140. For purposes of simplification of explanation, the same reference numbers are employed in FIGS. 1 and 2A-2H to denote the same structure. More particularly, FIG. 2A illustrates a first stage for both the first example and the second example. Additionally, FIGS. 2B-2E illustrate second to fifth stages of the first example, and FIGS. 2F-2H illustrate second to fourth stages of the second example. In the first stage of the first example and the second example, as depicted in FIG. 2A, the drone 100 can initially be positioned on the landing pad 124. In such a situation, the ground station 112 can provide commands wirelessly to the drone 100 that the drone 100 can employ to replace the first removeable device 134 with the second removeable device 140.

In the first example and the second example, the first removeable device 134 is mounted in a device receptacle situated in a top region of a wind turbine 200. More particularly, in the first example and the second example, the first removeable device 134 can be situated on a nacelle 210 of the wind turbine 200. The drone 100 can travel from the landing pad 124 to a region 214 near the nacelle 210 of the wind turbine 200. In the first example and the second example, the drone 100 can travel along a path indicated by a line 218.

The nacelle 210 forms a cover housing that houses components in the wind turbine 200, including a generator, gearbox, drive train and brake assembly. In the first example and the second example, the first removeable device 134 and the second removeable device 140 can be implemented as anemometers for the wind turbine 200. Thus, the second removeable device 140 is implemented as a replacement for the first removeable device 134 positioned on the nacelle 210 of the wind turbine 200. Although the first example and the second example describes the first removeable device 134 and the second removeable device 140 as being anemometers, in other examples, the first removeable device 134 and the second removeable device 140 can be implemented with other devices, including any sensor or similar device that is replaceable.

FIG. 2B illustrates a second stage of the first example, wherein the drone 100 has traveled to the region 214 that is proximal to the nacelle 210 of the wind turbine 200. The first removeable device 134 can be mounted in a device receptacle 230. The device receptacle 230 can be employed to implement the device receptacle 136 of FIG. 1. The device receptacle 230 can include a device mount. In the first example, the device receptacle 230 can include an apparatus for mechanically securing a given instance of a removeable device to the nacelle 210 of the wind turbine 200. Additionally, the device receptacle 230 can electrically couple the given instance of the removeable device to components within the wind turbine 200, such as a controller. The given instance of the removeable device can be implemented as either the first removeable device 134 or the second removeable device 140.

In the second stage of the first example, the drone 100 can be positioned such that the first bay 132 is aligned with and overlays the first removeable device 134. In the second stage, the drone 100 can descend in a direction indicated by an arrow 234 such that the first removeable device 134 is within the confines of the first bay 132. The first mounting mechanism within the first bay 132 of the drone 100 can actuate, dismounting the first removeable device 134 from the device receptacle 230 and stowing the first removeable device 134 in the first bay 132. The drone 100 can re-ascend in a direction opposite from the direction of the arrow 234. In the example illustrated, the lift-generating rotors 106 of the drone 100 generate sufficient lift to allow the drone 100 to continue to move in any direction (e.g., indicated by the cartesian coordinate system 114 of FIG. 1) while stowing the first removeable device 134 and the second removeable device 140 concurrently. Stated differently, the lift-generating rotors 106 ensure that the drone 100 has a cargo load capacity equal to at least the weight of the first removeable device 134 and the second removeable device 140 combined.

FIG. 2C illustrates a third stage of the first example, wherein the drone 100 has ascended away from the device receptacle 230 but remains in the region 214 that is proximal to the nacelle 210 of the wind turbine 200. In the third stage of the first example, the drone 100 is re-aligned such that the second bay 138 is aligned with and overlays the device receptacle 230. Upon aligning the second bay 138 with the device receptacle 230, the drone 100 can descend in a direction indicated by the arrow 244.

FIG. 2D illustrates a fourth stage of the first example, wherein the drone 100 has descended to a position wherein the second removeable device 140 engages with the device receptacle 230 and remains in the region 214 that is proximal to the nacelle 210 of the wind turbine 200. In the fourth stage, the second mounting mechanism of the second bay 138 actuates, thereby releasing the second removeable device 140 from the second bay 138 and causing the second removeable device 140 to mount on the device receptacle 230. The mounting of the second removeable device 140 with the device receptacle 230 causes the second removeable device 140 to be mechanically secured with the nacelle 210 and electrically coupled to a component (e.g., a controller) of the wind turbine 200. The drone 100, having released the second removeable device 140 can freely ascend.

FIG. 2E illustrates a fifth stage of the first example, wherein the drone 100 has ascended to a position away from the device receptacle 230. In the fifth stage, the drone 100 can return to the landing pad 124 illustrated in FIG. 2A.

As noted, FIG. 2A illustrates the first stage of the second example (and the first example), and FIGS. 2F-2H illustrate second to fourth stages of the second example. Continuing with the second example, FIG. 2F illustrates a second stage of the second example, wherein the drone 100 has traveled to the region 214 that is proximal to the nacelle 210 of the wind turbine 200. In the second example, the nacelle 210 of the wind turbine 200 has two device receptacles, namely a first device receptacle 250 and a second device receptacle 254. The first removable device 134 can be mounted in the first device receptacle 250. The first device receptacle 250 and the second device receptacle 254 can be employed to implement instances of the device receptacle 136 of FIG. 1. The first device receptacle 250 and the second device receptacle 254 can include a device mount. In the second example, the first device receptacle 250 and the second device receptacle 254 can both include an apparatus for mechanically securing a given instance of a removeable device to the nacelle 210 of the wind turbine 200. Additionally, in the second example, the device receptacle 230 can electrically couple the given instance of the removeable device to components within the wind turbine 200, such as a controller. The given instance of the removeable device can be implemented as either the first removeable device 134 or the second removeable device 140.

Additionally, in the second example, the second device receptacle 254 can operate as a backup for the first device receptacle 250 or vice versa. That is, the wind turbine 200 can be configured such that the given instance of the removeable device can be mounted on either of the first device receptacle 250 or the second device receptacle 254 and function properly. Additionally or alternatively, in some examples, both the first device receptacle 250 and the second device receptacle 254 can be coupled to an instance of the removable device concurrently.

In the second stage of the first example, the drone 100 can be positioned such that the first bay 132 is aligned with and overlays the first removeable device 134. In the second stage of the second example, the drone 100 can descend in a direction indicated by an arrow 256.

FIG. 2G illustrates a third stage of the second example, wherein the drone 100 has descended in the direction indicated by the arrow 256, such that the first removable device 134 is within the confines of the first bay 132 and the second removable device 134 is positioned to engage with the second device receptacle 254. In some examples, the first removable device 134 can be shaped to guide the descent of the drone 100 such that the second bay 138 overlays the second device receptacle 254, as illustrated in FIG. 2G. Additionally, as illustrated in FIG. 2G, the first device receptacle 250 and the second device receptacle 254 are spaced at a distance to allow the drone 100 to interact with both the first device receptacle 250 and the second device receptacle 254 contemporaneously. Additionally, the drone 100 remains in the region 214 that is proximal to the nacelle 210 of the wind turbine 200.

In the third stage of the second example, the second mounting mechanism of the second bay 138 actuates, thereby releasing the second removeable device 140 from the second bay 138 and causing the second removeable device 140 to mount on the second device receptacle 254. The mounting of the second removeable device 140 with the second device receptacle 254 causes the second removeable device 140 to be mechanically secured with the nacelle 210 and electrically coupled to a component (e.g., a controller) of the wind turbine 200. Contemporaneously, the first mounting mechanism within the first bay 132 of the drone 100 can actuate, dismounting the first removeable device 134 from the first device receptacle 250 and stowing the first removeable device 134 in the first bay 132.

It is noted that in some examples, the first removable device 134 can be stowed in the first bay 134 and the second removable device 140 can be mounted on the second device receptacle 254 and released from the second bay 138 concurrently (e.g., in a make-before-break mode of operation). Alternatively, in other examples, the second device receptacle 254 can be released from the second bay 138 and mounted on the second device receptacle 254 prior to stowing the first removable device 134 in the first bay 132 (e.g., in a break-before-make mode of operation). In either such example, the drone 100, having stowed the first removable device 134 and released the second removeable device 140 can freely ascend.

FIG. 2H illustrates a fourth stage of the second example, wherein the drone 100 has ascended to a position away from the first device receptacle 250 and the second device receptacle 254. In the fourth stage, the drone 100 can return to the landing pad 124 illustrated in FIG. 2A.

In the second example illustrated, the second removable device 140 can be mounted on the second device receptacle 256 and the first removable device 134 can be stowed in the first bay 132 in a single landing on the nacelle 130. Accordingly, operations in the second example obviate the need for a cargo load capacity of the drone 100 to be greater than the weight of the first removeable device 134 or the second removeable device 140 (assuming the weights are about equal). Stated differently, by positioning the first device receptacle 250 in close proximity with the second device receptacle 254, the drone 100 can replace the first removable device 134 with the second removable device 140 in a single landing on the nacelle 210.

Furthermore, as noted, there are examples where the lift-generating rotors 106 of the drone 100 generate sufficient lift to allow the drone 100 to continue to move in any direction (e.g., indicated by the cartesian coordinate system 114 of FIG. 1) while stowing the first removeable device 134 and the second removeable device 140 concurrently. In such examples, the drone 100 can carry both the first removable device 132 and the second removeable device 140, stowed in the first bay 132 and the second bay 138, respectively, to the first device receptacle 250 and the second device receptacle 254 concurrently for deployment. In such an example, the first removeable device 134 and the second removeable device 140 could be mounted on the first device receptacle 250 and the second device receptacle 254 in a single trip to the nacelle 130. Similarly, in such examples, it is possible that both the first removable device 134 and the second removable device 140 are simultaneously engaged with the respective first device receptacle 250 and the second device receptacle 254. In these examples, the drone 100 could stow the first removeable device 134 in the first bay 132 and the second removeable device 140 in the second removeable device 140 in the second bay 138 for retrieval in a single trip to the nacelle 210. In these examples, the mechanisms and or processes can be included in the landing pad 124 and/or the ground station 112 to accommodate the concurrent deployment or retrieval of the first removable device 134 and the second removable device 140.

As illustrated by the stages of the first example and the second example in FIGS. 2A-2H, the drone 100 can replace the first removeable device 134 with the second removeable device 140 in a single visit to an area proximal with the device receptacle 230 in the first example or proximal with the first device receptacle 250 and the second device receptacle 254 in the second example. Accordingly, in situations where serviceable components, such as the first removeable device 134, needs replaced in hard-to-reach areas, such as the nacelle 210 of the wind turbine 200, the drone 100 can replace the first removeable device 134 without a human scaling the wind turbine 200, thereby elevating overall operational safety of the wind turbine 200. Further, because the drone 100 can replace the first removeable device 134 with the second removeable device 140 in a single visit to the device receptacle 230 in the first example or to the first device receptacle 250 and the second device receptacle 254 in the second example (and without returning to the landing pad 124), downtime of the wind turbine 200 can be curtailed.

FIGS. 3A-3F illustrate stages of a third example method ("third example") where a drone 300 is deployed from a landing pad to replace a first removeable device 302 with the second removeable device 304. The drone 300 can be implemented with the drone 100 illustrated in FIGS. 1 and 2A-2E. Some portions of components illustrated in FIGS. 3A-3F are hidden from view to illustrate detailed operations of the stages of the third example.

In the third example, the first removeable device 302 and the second removeable device 304 are implemented as two instances of the same anemometer. Accordingly, the first removeable device 302 and the second removeable device 304 include a set (e.g., three) of hemispherical cups 306 that extend from a post 308. The post 308 can be affixed to a portable mount 314 of the first removeable device 302 and the second removeable device 304.

In some examples, the portable mount 314 can have a frustum shape, such as a conical frustum or a square frustum.

The post 308 can be mounted to an upper surface 318 of the portable mount 314. The portable mount 314 of the first removeable device 302 and the second removeable device 304 can include K number of locking pins 320, where K is an integer greater than or equal to one. The device receptacle 326 can include a base mount 328. The portable mount 314 can include a cavity 330 shaped to receive the base mount 328. In such a situation, the cavity 330 can be a mortise and the base mount 328 can be a tenon to form a mortise and tenon joint.

The K number of locking pins 320 can extend through a partial bore in a sidewall 334 in the cavity 330. In some examples, the K number of locking pins 320 can be on opposing sides of the sidewall 334 of the cavity 330 in the portable mount 314. In examples where the portable mount 314 has a conical frustum shape, the sidewall 334 can be a continuous surface. In examples where the portable mount 314 has a square frustum shape, the sidewall 334 can represent opposing surfaces. The portable mount 314 can include biasing springs 340 that bias the locking pins 320 toward an interior of the cavity 330. The base mount 328 can include partial bores 342 shaped to receive a portion of a corresponding locking pin 320. The portable mount 314 can be configured such that in situations where no external forces are applied and the cavity 330 receives the base mount 328, the biasing springs 340 force the locking pins 320 into the partial bores 342, mechanically securing the portable mount 314 with the base mount 328. Additionally, electrical connections can be established between the portable mount 314 and the device receptacle 326. Accordingly, upon mounting, the first removeable device 302 and the second removeable device 304 can communicate with other components, such as a controller of a wind turbine.

The drone 300 can include a drone body 350. The drone body 350 can have three lift-generating rotors extending therefrom (not shown in FIG. 3), such as the lift-generating rotors 106 of FIG. 1. A cargo region of the drone 300 underlies the drone body 350. The cargo region includes a first bay 354 and a second bay 360. The first bay 354 can include a first mounting mechanism 362 and the second bay 360 can include a second mounting mechanism 364. In the third example, the first mounting mechanism 362 and the second mounting mechanism 364 have the same structure and operate in the same manner. Thus, both the first mounting mechanism 362 and the second mounting mechanism 364 can mount, dismount or stow the first removeable device 302 or the second removeable device 304.

More particularly, in the third example the first mounting mechanism 362 and the second mounting mechanism 364 can each include electromagnets 368 mounted on a flared sidewall 370 of the respective first bay 354 or the second bay 360. The flared sidewall 370 of the first bay 354 and the second bay 360 can be shaped to match an exterior sidewall of the portable mount 314 of the first removeable device 302 and the second removeable device 304. Each electromagnet 368 can be positioned to interface with a corresponding locking pin 320 of the K number of locking pins 320. In an energized state, each electromagnet 368 can attract a corresponding proximal locking pin 320 of the K number of locking pins 320 away from the cavity 330 of the first removeable device 302 or the second removeable device 304. That is, the electromagnets 368 (in the energized state) induces a magnetic field with sufficient strength to move the locking pins 320 toward a respective proximal electromagnet 368 overcoming the bias of the biasing springs 340. In a non-energized state, the magnetic field induced by the electromagnet 368 is curtailed and the biasing springs 340 bias the locking pins 320 into the cavity 330 of the portable mount 314.

Figure 3A:
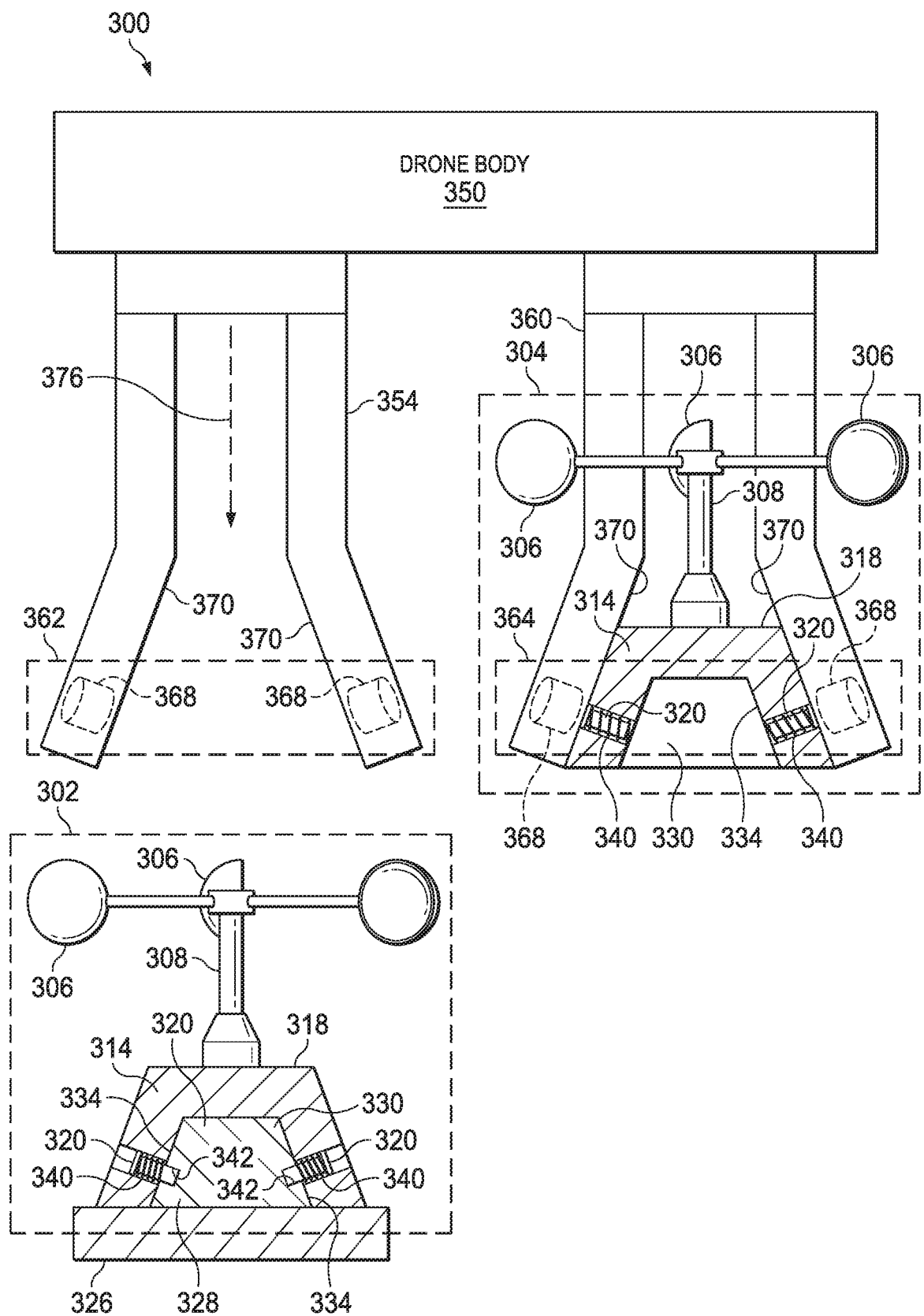
FIG. 3A illustrates a first stage of a third example method for replacing a removable device on a wind turbine.

Continuing with the third example, in the first stage illustrated in FIG. 3A, the first removeable device 302 is mounted on the device receptacle 326. Accordingly, the K number of locking pins 320 on the first removeable device 302 are biased into the partial bores 342 of the base mount 328. Additionally, in the first stage of the third example, the second removeable device 304 is stowed in the second bay 360. In the first stage of the third example, the electromagnets 368 of the second mounting mechanism 364 in the second bay 360 are in the energized state. Thus, the locking pins 320 of the second removeable device 304 are attracted to the electromagnets 368 of the second bay 360, keeping the second removeable device 304 securely stowed within the confines of the second bay 360.

Additionally, in the first stage of the third example, the drone 300 is aligned such that the first bay 354 overlays the first removeable device 302 mounted on the device receptacle 326. Accordingly, the drone 300 can descend in a direction indicated by the arrow 376 such that flared sidewalls 370 of the first bay 354 contact the sidewalls of the portable mount 314.

Figure 3B:
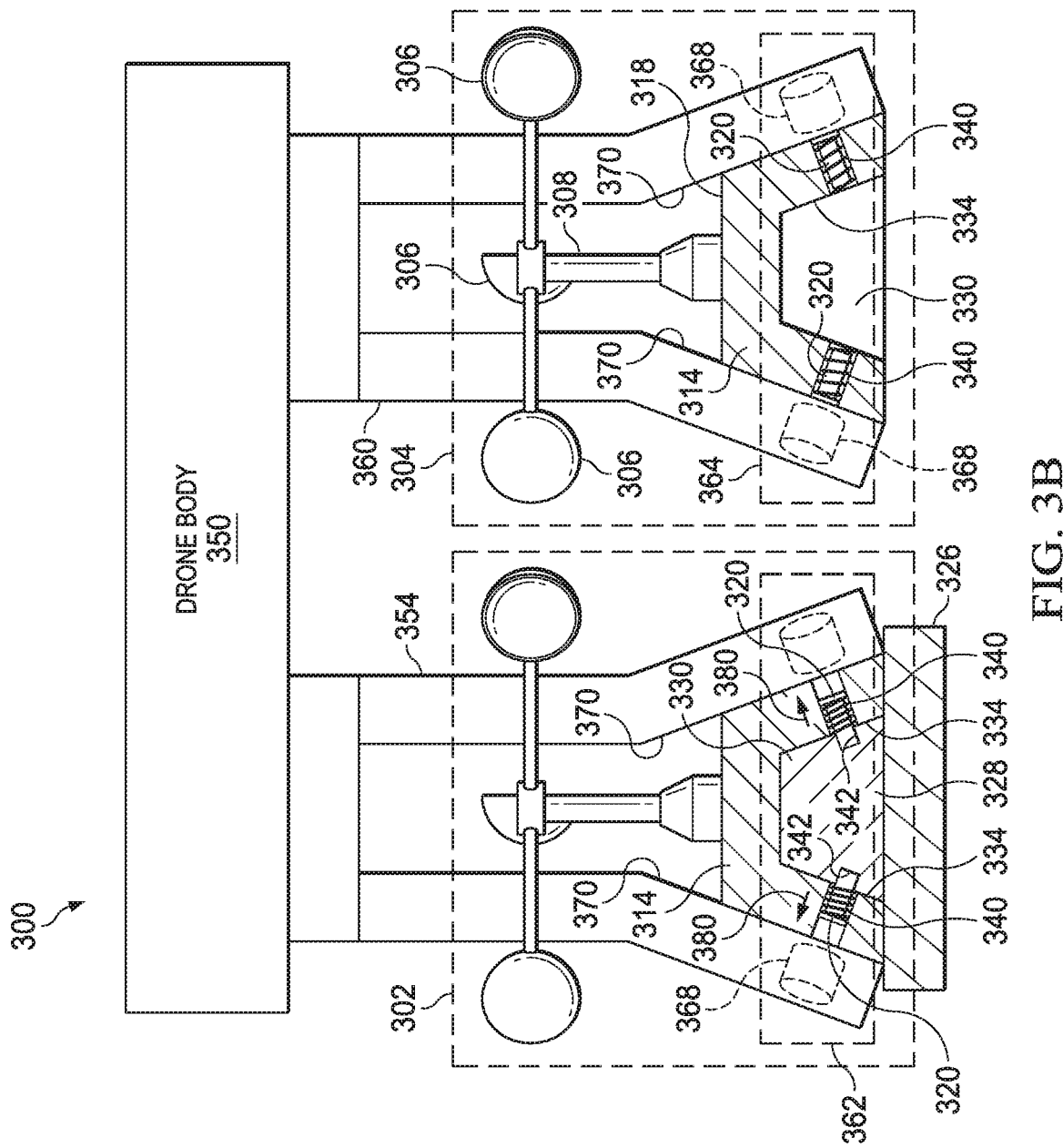
FIG. 3B illustrates a second stage of the third example method for replacing the removable device on the wind turbine.

FIG. 3B illustrates a second stage of the third example. In the second stage, the drone 300 has descended (e.g., in the direction of the arrow 376 of FIG. 3A), such that the flared sidewalls 370 of the first bay 354 contact the sidewall of the portable mount 314. Additionally, the first mounting mechanism 362 of the first bay 354 can be actuated to dismount the first removeable device 302 from the device receptacle 326. More specifically, the electromagnets 368 of the first mounting mechanism 362 in the first bay 354 can transition to the energized state. In the energized state, the locking pins 320 of the first removeable device 302 can move in a direction indicated by the arrows 380. Thus, the locking pins 320 of the first removeable device 302 can be removed from the partial bores 342 of the base mount 328 and toward the electromagnets 368 of the first bay 354.

Figure 3C:
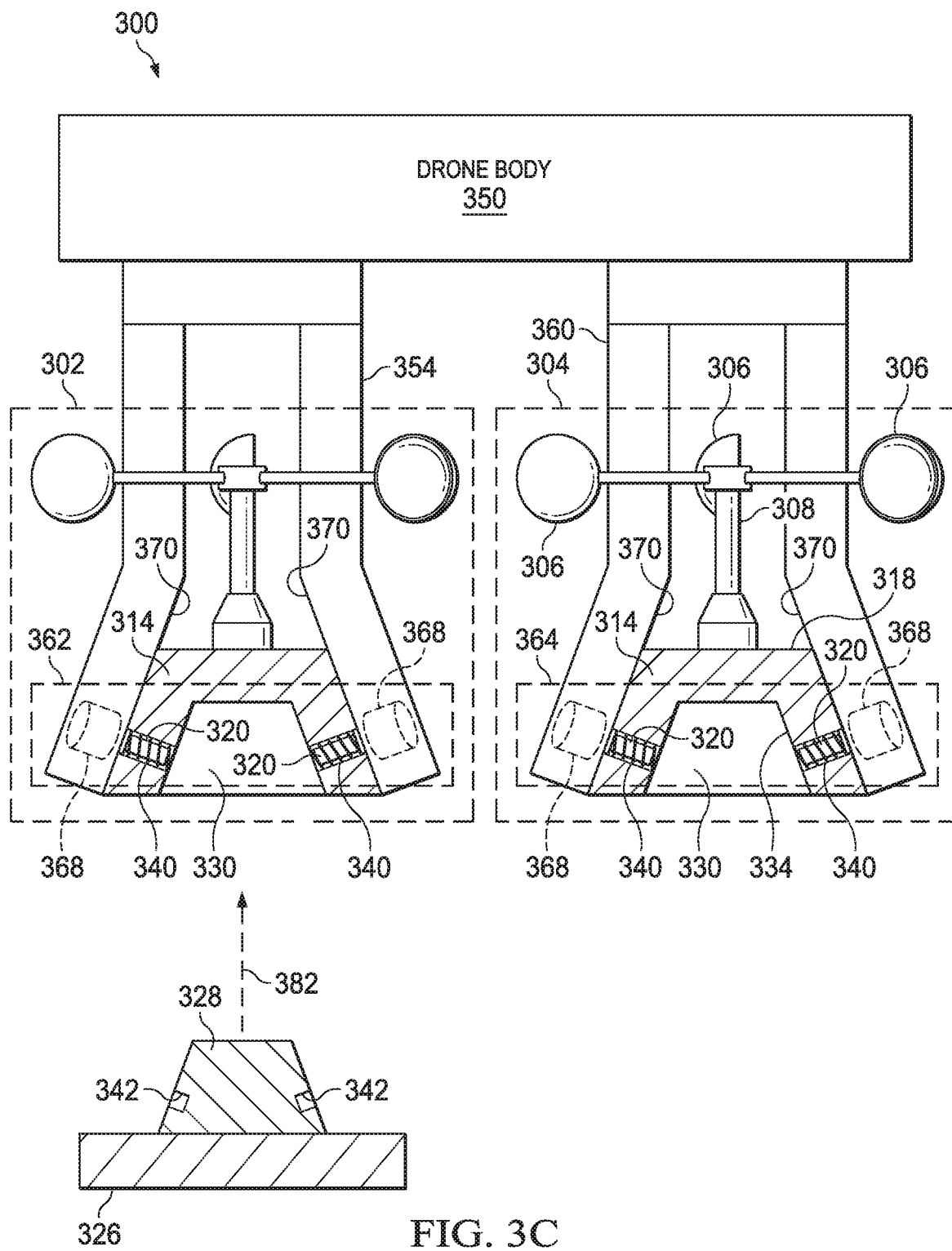
FIG. 3C illustrates a third stage of the third example method for replacing the removable device on the wind turbine.

FIG. 3C illustrates a third stage of the third example. In the third stage, the drone 300 has ascended in a direction indicated by the arrow 382. Moreover, the electromagnets 368 of the first mounting mechanism 362 and the second mounting mechanism 364 are in the energized state. Accordingly, in the third stage, the first removeable device 302 and the second removeable device 304 are stowed in the first bay 354 and the second bay 360, respectively. Accordingly, in the third stage, the first removeable device 302 has been dismounted from the device receptacle 326.

FIG. 3D illustrates a fourth stage of the third example. In the fourth stage, the drone 300 has been re-aligned such that the second bay 360 is aligned with and overlays the device receptacle 326. More particularly, the drone 300 is aligned such that the cavity 330 of the second removeable device 304 superposes the base mount 328 of the device receptacle 326. The drone 300 can descend in a direction indicated by the arrow 386 to initiate mounting of the second removeable device 304 on the device receptacle 326.

Figure 3E:
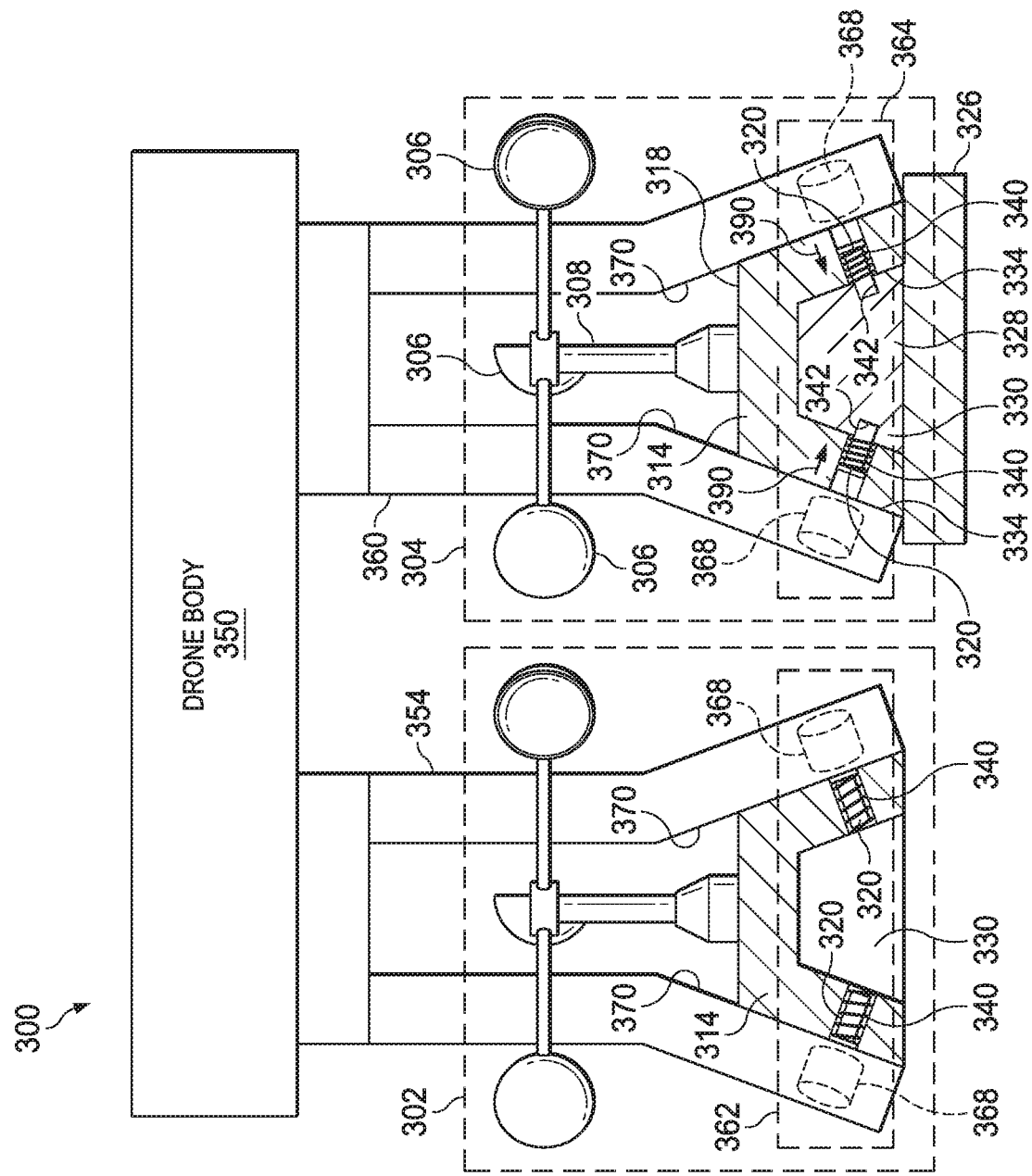
FIG. 3E illustrates a fifth stage of the third example method for replacing the removable device on the wind turbine.

FIG. 3E illustrates a fifth stage of the third example. In the fifth stage, the drone 300 has descended (e.g., in the direction indicated by the arrow 386 illustrated in FIG. 3D) such that the cavity 330 of the second removeable device 304 overlays the base mount 328 of the device receptacle 326. In the fifth stage of the third example, the second mounting mechanism 364 of the second bay 360 can mount the second removeable device 304 on the device receptacle 326. More particularly, in the fifth stage the electromagnets 368 of the second mounting mechanism 364 in the second bay 360 can transition to the de-energized state. In the de-energized state, the biasing springs 340 force the locking pins 320 of the second removeable device 304 to move in a direction indicated by the arrows 390. Moving the locking pins 320 of the second removeable device 304 causes the locking pins 320 to extend into the cavity 330 of the second removeable device 304 and to engage the partial bores 342 of the base mount 328. This action releases the second removeable device 304 from the second bay 360, allowing the drone 300 to ascend.

Figure 3F:
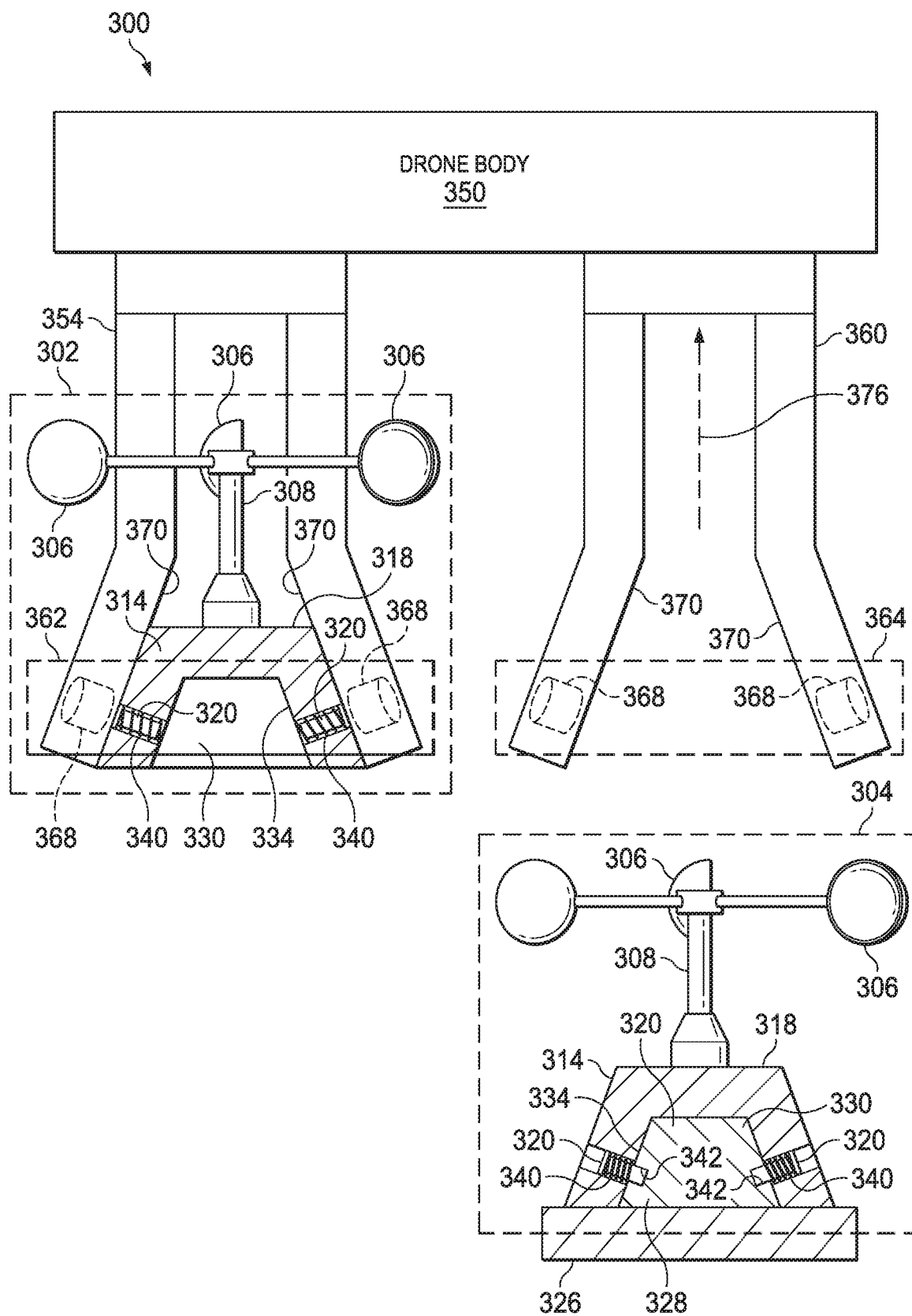
FIG. 3F illustrates a sixth stage of the third example method for replacing the removable device on the wind turbine.

FIG. 3F illustrates a sixth stage of the third example. In the sixth stage, the drone 300 has ascended in a direction indicated by the arrow 392. In the sixth stage, the first mounting mechanism 362 of the first bay 354 has stowed the first removeable device 302 in the first bay 354. Additionally, the second mounting mechanism 364 of the second bay 360 has mounted the second removeable device 304 on the device receptacle 326. At the sixth stage, the drone 300 can return to the landing pad or other area.

As illustrated in FIGS. 3A-3F, the drone 300 can replace the first removeable device 302 mounted on the device receptacle 326 with the second removeable device 304 without requiring a human to be proximal to the device receptacle 326. Accordingly, in situations where the device receptacle 326 is difficult and/or dangerous for a human to reach (e.g., near a top of a wind turbine), the drone 300 can replace the first removeable device 302 with the second removeable device 304 in a manner that is safer and faster than a human. Additionally, as is illustrated in FIG. 3A-3F, because the drone 300 includes two bays, namely the first bay 354 and the second bay 360, the drone 300 can replace the first removeable device 302 with the second removeable device 304 in a single visit to the device receptacle 326. Thus, downtime of the system (e.g., a wind turbine) that employs the first removeable device 302 and the second removeable device 304 can be curtailed.

Figure 4A:
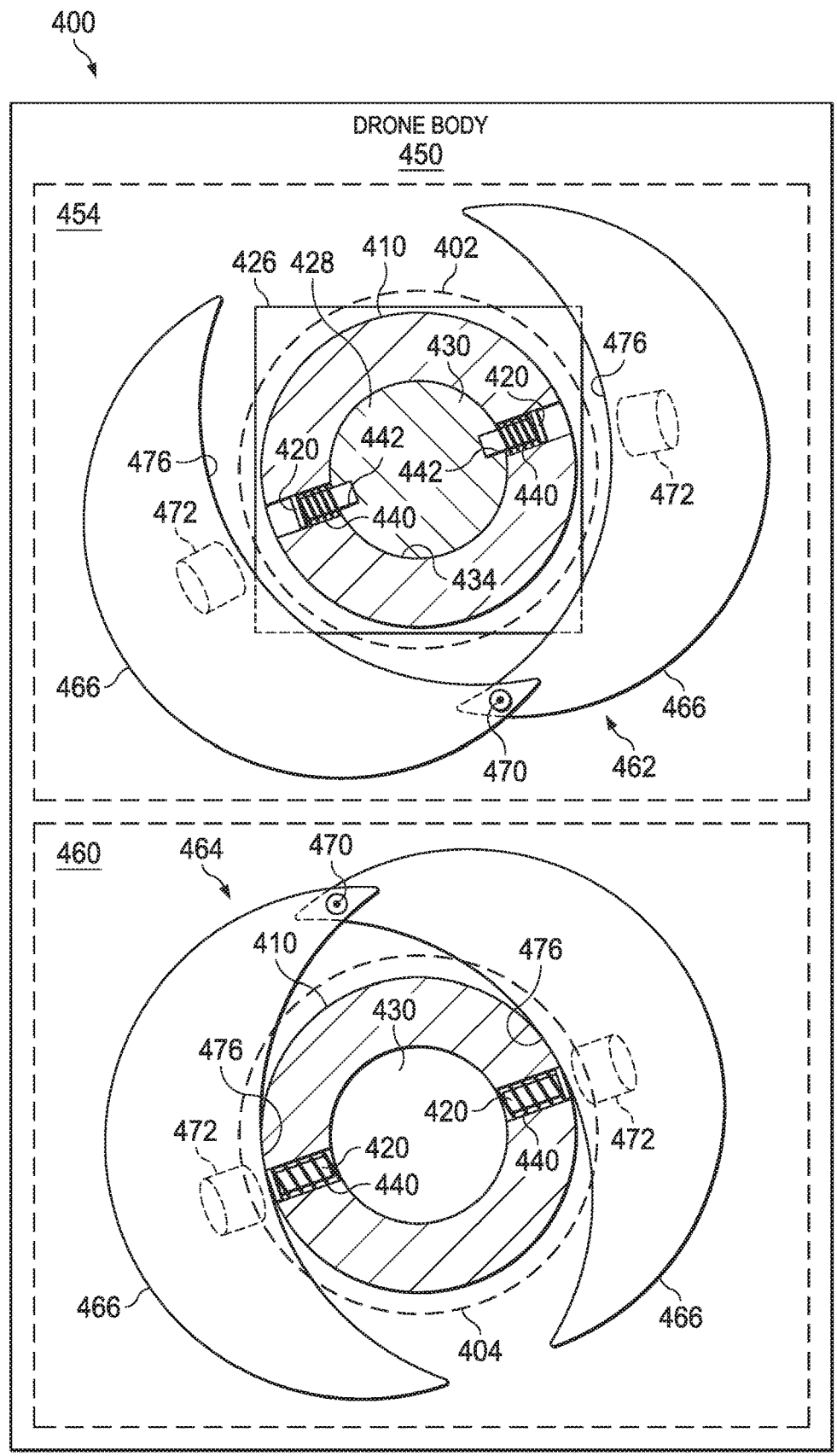
FIG. 4A illustrates a first stage of a fourth example method for replacing a removable device.
Figure 4B:
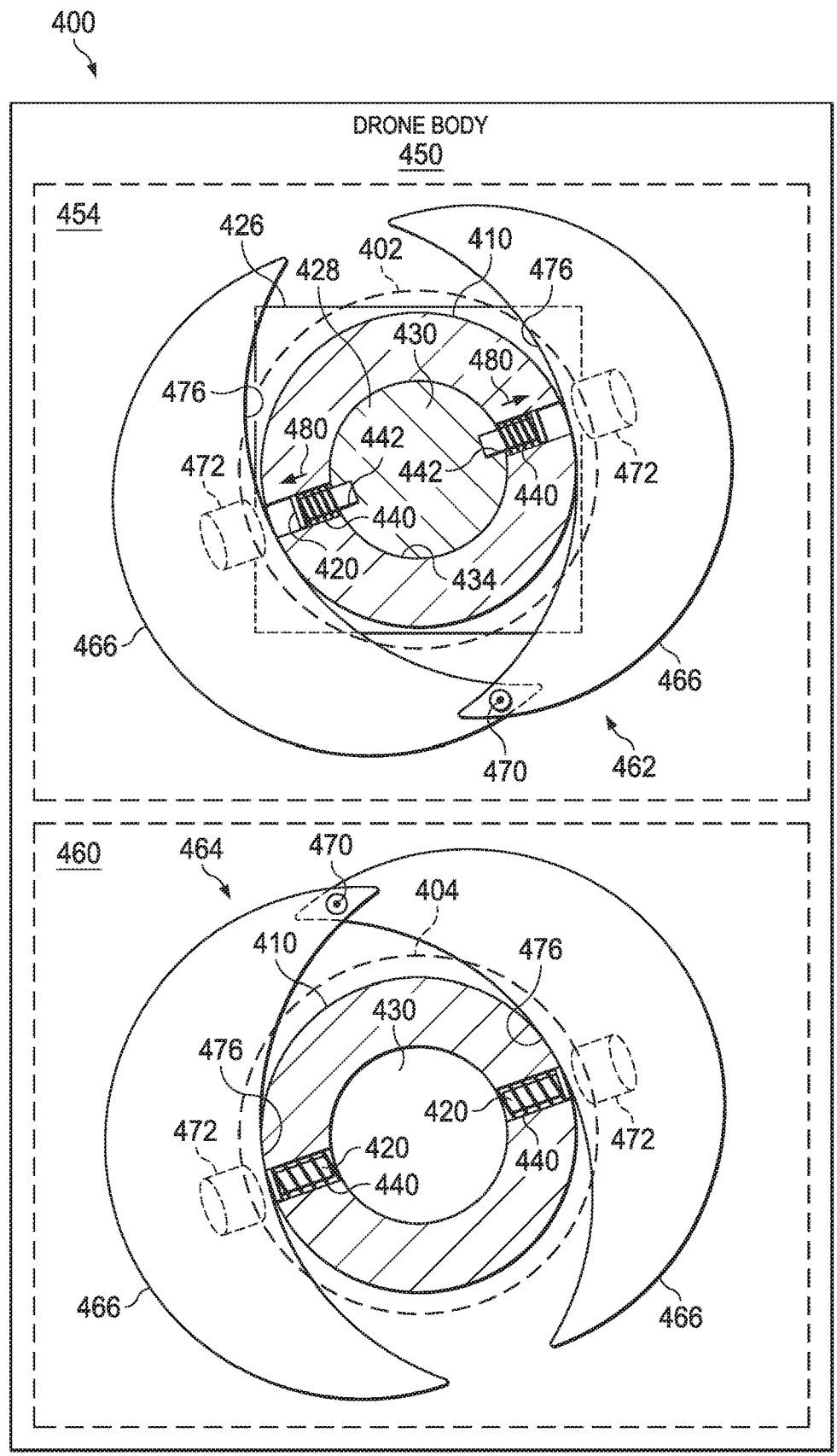
FIG. 4B illustrates a second stage of the fourth example method for replacing the removable device.
Figure 4C:
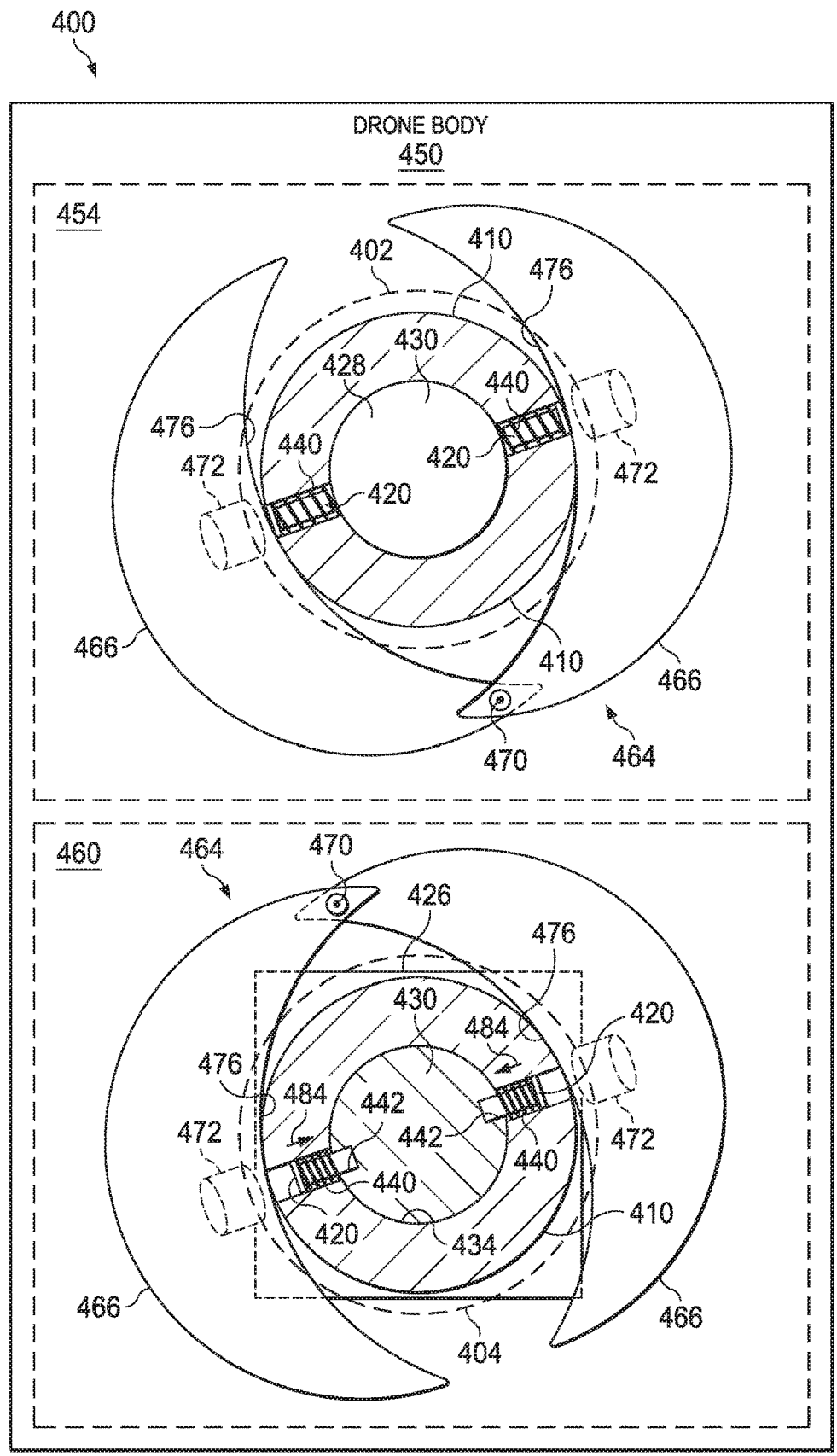
FIG. 4C illustrates a third stage of the fourth example method for replacing the removable device.

FIGS. 4A-4C illustrates stages of a fourth example method ("fourth example") where a drone 400 is deployed from a landing pad to replace a first removeable device 402 with the second removeable device 404. The drone 400 can be implemented with the drone 100 illustrated in FIGS. 1 and 2A-2E. Some portions of components illustrated in FIGS. 4A-4C are hidden from view to illustrate detailed operations of the stages of the fourth example. For purposes of illustration, the drone 400 is depicted from an overhead view.

In the fourth example, the first removeable device 402 and the second removeable device 404 can be implemented as two instances of the same sensor or output device, such as a temperature sensor, an anemometer, a light emitting device, etc. Components of each such removeable device can be mounted on a portable mount 410 of the first removeable device 402 and the second removeable device 404.

In the fourth example, the portable mount 410 can have a frustum shape, such as a conical frustum. The portable mount 410 of the first removeable device 402 and the second removeable device 404 can include K number of locking pins 420, where K is an integer greater than or equal to one. A device receptacle 426 can include a base mount 428. The portable mount 410 can include a cavity 430 shaped to receive the base mount 428. In such a situation, the cavity 430 can be a mortise and the base mount 428 can be a tenon to form a mortise and tenon joint.

The K number of locking pins 420 can extend through a partial bore in a sidewall 434 in the cavity 430. In some examples, the K number of locking pins 420 can be on opposing sides of the sidewall 434 of the cavity 430 in the portable mount 410. In the fourth example, where the portable mount 410 has a conical frustum shape, the sidewall 434 can be a continuous surface. The portable mount 410 can include biasing springs 440 that bias the locking pins 420 toward an interior of the cavity 430. The base mount 428 can include partial bores 442 shaped to receive a portion of a corresponding locking pin 420. The portable mount 410 can be configured such that in situations where no external forces are applied and the cavity 430 receives the base mount 428, the biasing springs 440 force the locking pins 420 into the partial bores 442, mechanically securing the portable mount 410 with the base mount 428. Additionally, electrical connections can be established between the portable mount 410 and the device receptacle 426. Accordingly, upon mounting, the first removeable device 402 and the second removeable device 404 can communicate with other components, such as a controller of a wind turbine.

The drone 400 can include a drone body 450. The drone body 450 can have three lift-generating rotors extending therefrom (not shown in FIG. 4), such as the lift-generating rotors 106 of FIG. 1. A cargo region of the drone 400 underlies the drone body 450. The cargo region includes a first bay 454 and a second bay 460. The first bay 454 can include a first mounting mechanism 462 and the second bay 460 can include a second mounting mechanism 464. In the fourth example, the first mounting mechanism 462 and the second mounting mechanism 464 have the same structure and operate in the same manner. Thus, both the first mounting mechanism 462 and the second mounting mechanism 464 can mount, dismount or stow the first removeable device 402 or the second removeable device 404.

In the fourth example, the first mounting mechanism 462 and the second mounting mechanism 464 can each include a set of clamp arms 466. More particularly, the first mounting mechanism 462 and the second mounting mechanism 464 can include two clamp arms 466 that rotate in opposing directions (e.g., a first direction and a second direction) about a pivot point 470. Each clamp arm 466 can include an electromagnet (or multiple electromagnets) 472 mounted on an inside sidewall 476 (e.g., a curved sidewall) of the respective clamp arm 466. The inside sidewall 476 of each clamp arm 466 of the first bay 454 and the second bay 460 can be shaped to grip an exterior sidewall of the portable mount 410 of the first removeable device 402 and the second removeable device 404. In an energized state, each electromagnet 472 can attract a corresponding proximal locking pin 420 of the K number of locking pins 420 away from the cavity 430 of the first removeable device 402 or the second removeable device 404. That is, the electromagnets 472 (in an energized state) induces a magnetic field with sufficient strength to move the locking pins 420 toward a proximal respective electromagnet 472 overcoming the bias of the biasing springs 440. In a non-energized state, the magnetic field induced by the electromagnet 472 is curtailed and the biasing springs 440 bias (move) the locking pins 420 into the cavity 430 of the portable mount 410.

Continuing with the fourth example, in the first stage illustrated in FIG. 4A, the first removeable device 402 is mounted on the device receptacle 426. Accordingly, the K number of locking pins 420 on the first removeable device 402 are biased into the partial bores 442 of the base mount 428. Additionally, in the first stage of the fourth example, the second removeable device 404 is stowed in the second bay 460. In the first stage of the fourth example, the electromagnets 472 of the second mounting mechanism 464 in the second bay 460 are in the energized state. Thus, the locking pins 420 of the second removeable device 404 are attracted to the electromagnets 472 of the second bay 460, keeping the second removeable device 404 securely stowed within the confines of the second bay 460.

Additionally, in the first stage of the fourth example, the drone 400 is aligned such that the first bay 454 superposes (hovers over) the first removeable device 402 mounted on the device receptacle 426. Accordingly, the drone 400 can descend such that the first removeable device 402 is within the confines of the first bay 454.

FIG. 4B illustrates a second stage of the fourth example. In the second stage, the first mounting mechanism 462 of the first bay 454 is actuated, causing the clamp arms 466 of the first mounting mechanism 462 to rotate in opposing directions about the pivot point 470 such that the inside sidewall 476 of the clamp arms 466 contact the outer sidewall of the portable mount 410. Additionally, the electromagnets 472 of the first mounting mechanism 462 can be transitioned to an energized state, inducing a magnetic force causing the locking pins 420 of the first removeable device 402 to move in a direction indicated by the arrows 480. In this manner, the first mounting mechanism 462 of the first bay 454 can dismount the first removeable device 402 from the device receptacle 426 and securely stow the first removeable device 402 in the first bay 454. Thus, in the second stage of the fourth example, the first removeable device 402 is stowed in the first bay 454 and the second removeable device 404 is stowed in the second bay 460. Additionally, the drone 400 can ascend and be re-aligned such that the cavity 430 of the second removeable device 404 superposes (hovers over) the base mount 428 of the device receptacle 426.

FIG. 4C illustrates a third stage of the fourth example. In the third stage, the drone 400 can descend to bring the sidewall 434 of the cavity 430 of the second removeable device 404 in contact with the base mount 428 of the device receptacle 426. In the third stage, the electromagnets 472 of the second mounting mechanism 464 of the second bay 460 can be transitioned to the de-energized state. In the de-energized state, the locking pins 420 of the second removeable device 404 are biased (moved) by the biasing springs 440 in the direction indicated by the arrows 484 and into the partial bores 442 of the base mount 428. Additionally, the clamp arms 466 of the second mounting mechanism 464 rotate away from the second removeable device 404 thereby releasing the second removeable device from the second bay 460. In this manner, the second mounting mechanism 464 of the second bay 460 can mount the second removeable device 404 on the device receptacle 426. The drone 400 can return to the landing pad or other location.

As is illustrated in FIGS. 4A-4C, the drone 400 can replace the first removeable device 402 mounted on the device receptacle 426 with the second removeable device 404 without requiring a human to be proximal to the device receptacle 426. Accordingly, in situations where the device receptacle 426 is difficult and/or dangerous for a human to reach (e.g., near a top of a wind turbine), the drone 400 can replace the first removeable device 402 with the second removeable device 404 in a manner that is safer and faster than a human. Additionally, as is illustrated in FIG. 4A-3C, because the drone 400 includes two bays, namely the first bay 454 and the second bay 460, the drone 400 replace the first removeable device 402 with the second removeable device 404 in a single visit to the device receptacle 426. Thus, downtime of the system (e.g., a wind turbine) that employs the first removeable device 402 and the second removeable device 404 can be curtailed.

Figure 5:
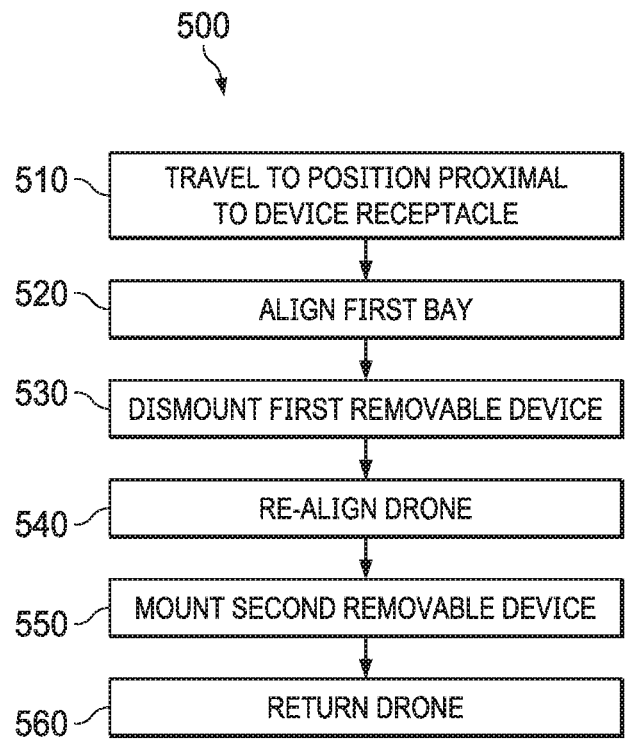
FIG. 5 illustrates a flowchart of an example method for replacing a removable device with a drone.

In view of the foregoing structural and functional features described above, example methods will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 illustrates a flowchart of an example method 500 for replacing a first removeable device mounted in a device receptacle with a second removeable device in a single visit to the device receptacle. The method 500 can be executed by a drone, such as the drone 100 of FIG. 1, the drone 300 of FIGS. 3A-3F and/or the drone 400 of FIGS. 4A-4C. The device receptacle (e.g., the device receptacle 136 of FIG. 1) may be in a difficult and/or dangerous location for a human, such as a top region of a wind turbine. The first removeable device can be implemented, for example with the first removeable device 134 of FIG. 1 and the second removeable device can be implemented with the second removeable device 140 of FIG. 1.

At 510, the drone can travel, such as from a landing pad, to a position proximal to the device receptacle. At 520, the drone can be aligned such that the first bay superposes the first removeable device, such that the first removeable device is positioned within the confines of a first bay (e.g., the first bay 132 of FIG. 1) of the drone. At 530, the drone can actuate a first mounting mechanism of the first bay to dismount the first removeable device from the device receptacle and to stow the first removeable device in the first bay.

At 540, the drone can be re-aligned such that a second bay (e.g., the second bay 138 of FIG. 1) of the drone superposes the device receptacle. At 550, the drone actuates a second mounting mechanism of the second bay to mount the second removeable device on the device receptacle, releasing the second removeable device from storage. At 560, the drone can return to the landing pad or other location.

Figure 6:
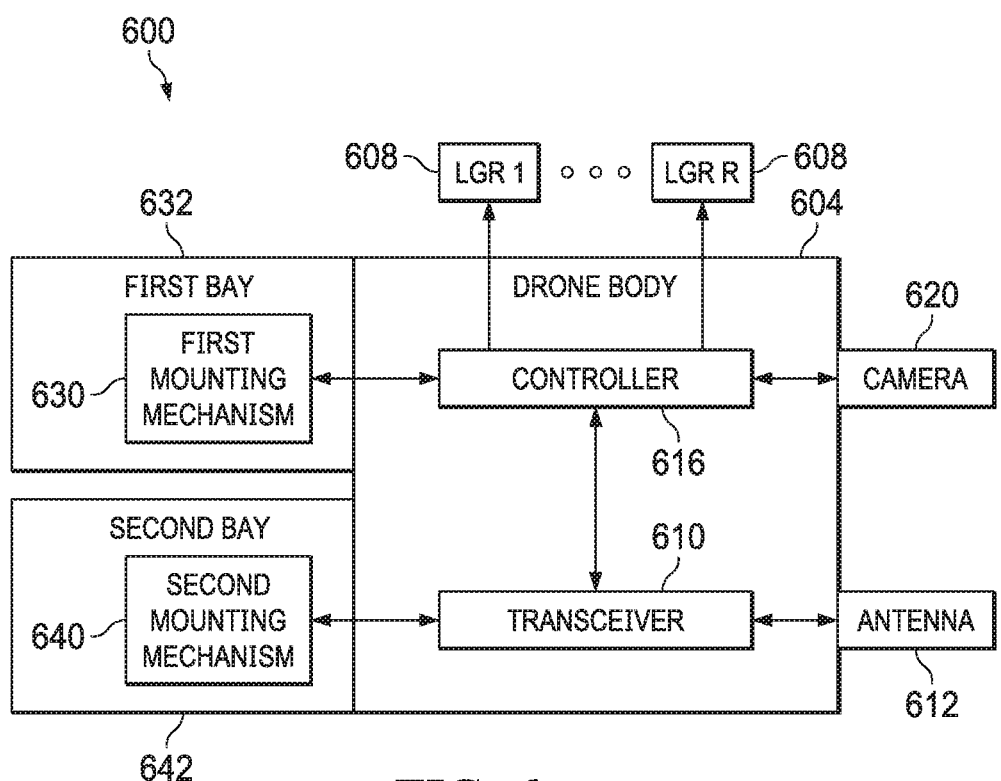
FIG. 6 illustrates a functional block diagram of a drone for replacing a removable device.

FIG. 6 illustrates a functional block diagram of a drone 600 that is deployable to replace a removeable device from a device receptacle in a single visit to the device receptacle. The drone 600 can be implemented with the drone 100 of FIG. 1, the drone 300 of FIG. 3A-3F and/or the drone 400 of FIGS. 4A-4C. The drone 600 can include a drone body 604 that can house circuitry for operations of the drone 600. The drone 600 can be implemented as a multicopter, namely, a rotorcraft with R number of lift-generating rotors 608 (labeled as "LGR" in FIG. 6), where R is an integer greater than or equal to three.

The drone body 104 can house a wireless transceiver 6110 to wirelessly communicate with a ground station or another entity. The wireless transceiver 610 can be coupled to an antenna 612 affixed to the drone body 604 to communicate (transmit and receive) wireless signals with the ground station. The wireless transceiver 610 can receive commands from the ground station. Moreover, the drone body 104 can house a controller 616 that can interpret commands provided through the transceiver and control operations of the drone 100. In particular, the controller 616 can selectively and individually control a rotational speed of the R number of lift-generating rotors 608. Changing a rotational speed of one or more lift-generating rotors 608 relative to another lift-generating rotor 608 causes the drone 600 to move in a specific direction.

The drone 600 can include a camera 620 that can capture images in real-time and provide the captured images to the controller 616. In response, the controller 616 can encode the images and provide the encoded images to the wireless transceiver 610 and transmit the encoded images to the ground station. In this manner, an operator (e.g., a user or a computing platform) can observe in real-time (e.g., within one second) a point of view of the drone 600.

The controller 616 can communicate with and control a state of a first mounting mechanism 630 of a first bay 632 of the drone 600. The first bay 632 can be affixed to and underlay the drone body 604. The controller 616 can also communicate with and control state of a second mounting mechanism 640 of a second bay 642 of the drone 600. The second bay 642 can also be affixed to and underlay the drone body 604. The first mounting mechanism 630 can be employed to mount or dismount a first removeable device from a device receptacle and to intermittently stow the first removeable device in the first bay 632. Additionally, the second mounting mechanism 640 can be employed to mount or dismount a second removeable device from the device receptacle and to intermittently stow the second removeable device in the second bay 642.

As explained, the first mounting mechanism 630 and the second mounting mechanism 640 can include features such as electromagnetics and clamp arms to facilitate mounting, dismounting and stowing of removable devices. Additionally or alternatively, the first mounting mechanism 630 and the second mounting mechanism 640 can include respective motors that spins a removable device in a direction that unscrews or screws the first removeable device from/to the device receptacle to facilitate the mounting or dismounting. Accordingly, the drone 600 can replace the first removeable device mounted on the device receptacle with the second removeable device in a single visit in a manner described herein.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A drone for replacing a first removeable device with a second removeable device, the drone comprising:
   a drone body with at least three lift-generating rotors spaced apart from the drone body and operating in concert that provide lift sufficient to propel the drone in at least six directions;
   a first bay for interfacing with the first removable device, the first bay being attached to the drone body, the first bay comprising a first mounting mechanism to dismount the first removeable device from a device receptacle and to securely stow the first removable device, the first mounting mechanism of the first bay further comprises:
      an electromagnet positioned to interface with a locking pin in the first removeable device, wherein the locking pin of the first removeable device is biased away from the electromagnet and the locking pin moves toward the electromagnet if the electromagnet is in an energized state to stow the first removable device in the first bay;

a second bay for interfacing with the second removeable device, the second bay being attached to the drone body comprising a second mounting mechanism to stow a second removeable device and to mount the second removeable device on the device receptacle.

2. The drone of claim 1, wherein the electromagnet is a first electromagnet, the locking pin is a first locking pin and the first bay further comprises:
a second electromagnet positioned to oppose the first electromagnet and positioned to interface with a second locking pin in the first removeable device, wherein the second locking pin of the first removeable device is biased away from the second electromagnet and the second locking pin moves toward the second electromagnet if the second electromagnet is in an energized state.

3. The drone of claim 2, wherein the first and second locking pins are components of a portable mount of the first removeable device.

4. The drone of claim 3, wherein the portable mount comprises biasing springs that bias the first locking pin and the second locking pin away from the first electromagnet and the second electromagnet.

5. The drone of claim 4, wherein the device receptacle comprises a base mount, and the portable mount of the first removeable device comprises a cavity shaped to receive the base mount.

6. The drone of claim 5, wherein the first bay comprises:
a flared sidewall shaped to contact an outer surface of the first removeable device.

7. The drone of claim 5, wherein the first bay comprises:
a first clamp arm that pivots about a pivot point in a first direction; and
a second clamp arm that pivots about the pivot point in a second direction, opposing the first direction, wherein the first clamp member and the second clamp member engage an outer surface of the first removeable device.

8. The drone of claim 5, wherein the first mounting mechanism and the second mounting mechanism are different instances of the same mounting mechanism.

9. The drone of claim 1, wherein:
the first mounting mechanism of the first bay comprises a first motor configured to spin the first removeable device in a direction that unscrews the first removeable device from the device receptacle; and
the second mounting mechanism of the second bay comprises a second motor configured to spin the removeable device in a direction that screws the second removeable device into the device receptacle.

10. The drone of claim 1, wherein the at least three lift-generating rotors of the drone body provide sufficient lift to enable the drone to move in the at least six directions while stowing the first removeable device in the first bay and the second removeable device in the second bay concurrently.

11. The drone of claim 10, wherein the first removeable device is a first anemometer and the second removeable device is a second anemometer.

12. The drone of claim 11, wherein the device receptacle is positioned in a top region of a wind turbine.

13. A drone for replacing a first removeable device with a second removeable device, the drone comprising:

a first bay for interfacing with the first removeable device, the first bay being attached to an underside of a drone body, the first bay comprising a first mounting mechanism to dismount or mount the first removeable device from a device receptacle and to securely stow the first removeable device, the first mounting mechanism of the first bay comprising a first motor configured to spin the first removeable device in a direction that unscrews the first removeable device from the device receptacle;

a second bay for interfacing with the second removable device, the second bay being attached to the underside of the drone body, the second bay comprising a second mounting mechanism to dismount or mount a second removeable device from the device receptacle and to securely stow the first removeable device, the second mounting mechanism of the second bay comprising a second motor configured to spin the removeable device in a direction that screws the second removeable device into to the device receptacle;

at least three lift-generating rotors mounted on arms extending from the drone body and operating in concert that provide lift sufficient to propel the drone in at least six directions;

a wireless transceiver configured to communicate with a ground station; and a controller that controls a state of the first mounting mechanism, a state of the second mounting mechanism and a speed of rotation of the at least three lift-generating rotors in response to commands received at the wireless transceiver.

14. The drone of claim 13, wherein the first mounting mechanism and the second mounting mechanism are different instances of the same mechanism.

15. The drone of claim 13, wherein the at least three lift-generating rotors provide lift sufficient to propel the drone in at least six directions in a condition where the first removeable device and the second removeable device are stowed.

16. The drone of claim 13, further comprising a camera that captures a live image from a vantage point of the drone to the ground station via the wireless transceiver of the drone.

17. A method for replacing a removeable device with a drone, the method comprising:
aligning a drone such that a first bay of the drone overlays a first removeable device mounted in a first device receptacle, wherein a second bay of the drone stows a second removeable device;
dismounting, with a first mounting mechanism of the first bay, the first removeable device from the first device receptacle;
stowing, with the first mounting mechanism of the first bay, the first removeable device in the first bay of the drone;
mounting, with a second mounting mechanism of the second bay, the second removeable device in the first device receptacle or a second device receptacle, wherein the first removeable device is stowed in the first bay of the drone.

18. The method of claim 17, wherein the aligning further comprises aligning the drone such that the second bay of the drone overlays the second receptacle, and the second removeable device is mounted in the second device receptacle.

19. The method of claim 17, further comprising:
re-aligning the drone, such that the second bay of the drone overlays the first device receptacle, wherein the drone remains airborne throughout operations of the method, such that the drone replaces the removeable device in a single visit to the first device receptacle and the second device is mounted in the first device receptacle.

\* \* \* \* \*